United States Patent
Yasuda et al.

(10) Patent No.: US 7,053,554 B2
(45) Date of Patent: May 30, 2006

(54) BULB-SHAPED FLUORESCENT LAMP AND ILLUMINATION DEVICE

(75) Inventors: Takeo Yasuda, Yokohama (JP); Kunihiko Ikada, Zushi (JP); Toshiyuki Ikeda, Yokosuka (JP); Yuichiro Takahara, Yokosuka (JP); Tetsuya Oono, Kanazawa-Ku (JP); Nobuhiro Tamura, Yokosuka (JP); Masahiro Izumi, Fujisawa (JP)

(73) Assignee: Toshiba Lighting & Technology Corporation, Tokyo (JP)

( * ) Notice: Subject to any disclaimer, the term of this patent is extended or adjusted under 35 U.S.C. 154(b) by 358 days.

(21) Appl. No.: 10/619,494

(22) Filed: Jul. 16, 2003

(65) Prior Publication Data

US 2004/0017156 A1  Jan. 29, 2004

(30) Foreign Application Priority Data

| Jul. 16, 2002 | (JP) | ............................ | 2002-206584 |
| Aug. 30, 2002 | (JP) | ............................ | 2002-256016 |
| Sep. 24, 2002 | (JP) | ............................ | 2002-278028 |
| Dec. 24, 2002 | (JP) | ............................ | 2002-372633 |
| Dec. 27, 2002 | (JP) | ............................ | 2002-378869 |

(51) Int. Cl.
*H01J 61/34* (2006.01)

(52) U.S. Cl. ........................ 313/634; 313/493; 315/56

(58) Field of Classification Search ..................... None
See application file for complete search history.

(56) References Cited

U.S. PATENT DOCUMENTS

| 4,645,972 A | * | 2/1987 | Takao et al. ................. 313/634 |
| 2002/0109462 A1 | * | 8/2002 | Nishio et al. .................. 315/56 |

FOREIGN PATENT DOCUMENTS

| JP | 2001-243913 | 9/2001 |
| JP | 3262168 | 12/2001 |

\* cited by examiner

*Primary Examiner*—David Vu
(74) *Attorney, Agent, or Firm*—Oblon, Spivak, McClelland, Maier & Neustadt, P.C.

(57) ABSTRACT

A bulb-shaped fluorescent lamp with an emission bulb having a bent tube and a lighting device having a circuit board and electronic parts mounted on the circuit board. The lighting device has a cover member with a cap and a holder for holding the emission bulb and the circuit board has a great part of its electronic parts disposed on the cap side. The lighting device has a fine tube that extends from the end of a portion of the bent tube toward the cap side within the cover member, and protrudes so that the surface temperature of a portion of said fine tube is kept in the range between 40–70°C. at the time of normal lighting and/or the fine tube extending from the end of the bent tube toward the cap side within the cover member protrudes from the end of said bent tube by 25–70 mm.

39 Claims, 18 Drawing Sheets

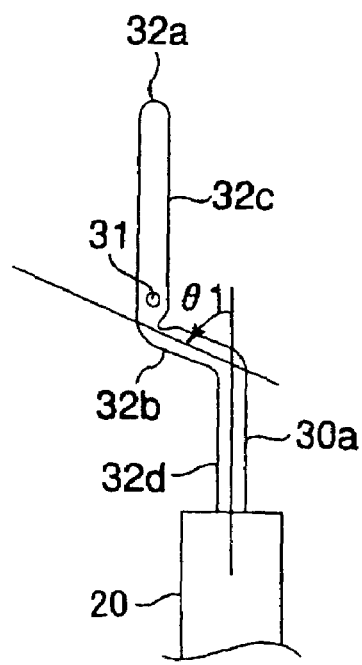
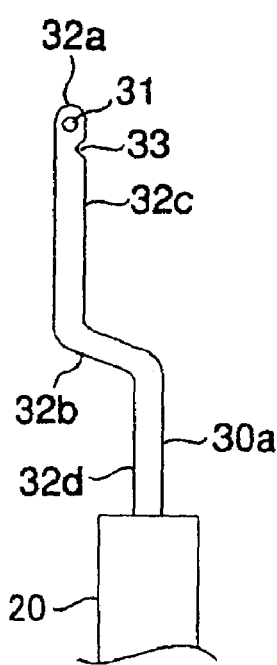
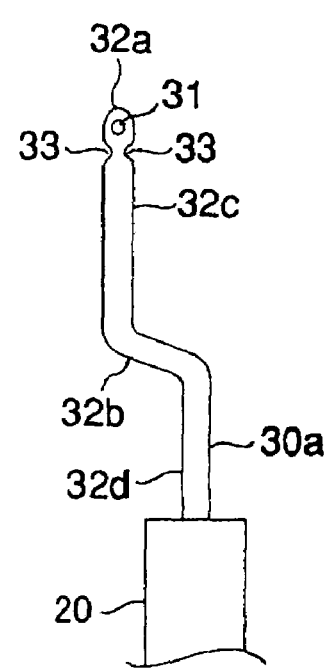
FIG. 5A    FIG. 5B    FIG. 5C
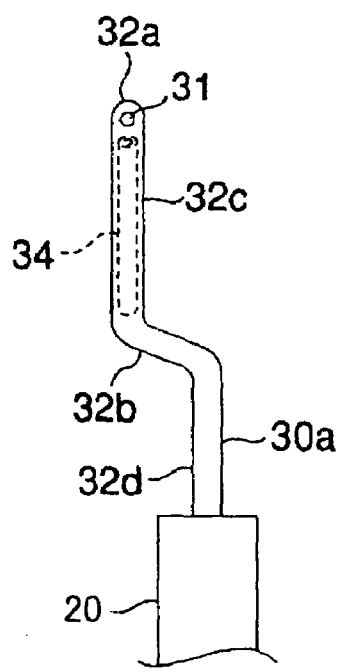
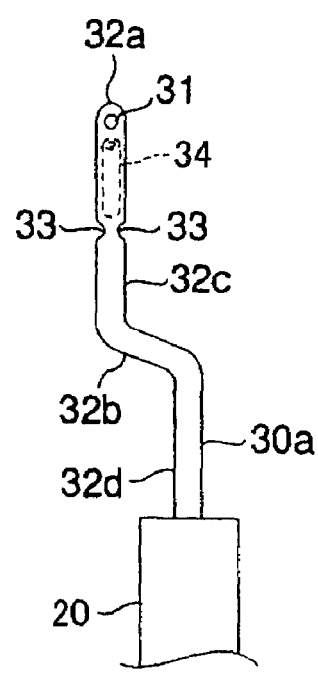
FIG. 5D    FIG. 5E

BULB-SHAPED FLUORESCENT LAMP AND ILLUMINATION DEVICE

BACKGROUND OF THE INVENTION

1. Field of the Invention

The present invention relates to a bulb-shaped fluorescent lamp and an illumination device including the aforementioned bulb-shaped fluorescent lamp, and more particularly to a bulb-shaped fluorescent lamp and an illumination device with improved light quantity rising properties.

2. Description of the Related Art

In recent years, small-sized bulb-shaped fluorescent lamps have been developed generally comparable in size with normal incandescent lamps, and demand for bulb-shaped fluorescent lamps which can be substituted for normal incandescent lamps is increasing.

Due to the improvement of the lamp technique and lighting circuit technique, the efficiency of the bulb-shaped fluorescent lamp is improving. However, due to the surface area of the main unit of the bulb-shaped fluorescent lamp being reduced owing to reduction of the size thereof, the emission bulb readily exhibits high temperature, even in the event that the heat emission value output from the emission bulb is not excessively great. In particular, with the bulb-shaped fluorescent lamp having a structure wherein the emission bulb has been covered with a globe in order to assume an external view similar to normal incandescent lamps, the temperature of the emission bulb can exceed 100° C. Accordingly, with the emission bulbs in which pure mercury has been sealed, the mercury vapor pressure excessively increases within the emission bulb, leading to reduction of light output. Accordingly, a technique has been known wherein with the fluorescent lamp for lighting under high temperature, an amalgam which is an alloy of mercury (Hg) and indium (In), lead (Pb), tin (Sn), bismuth (Bi), or the like, is sealed into the emission bulb so that the mercury vapor pressure is optimally controlled, thereby improving the lighting efficiency (see Japanese Unexamined Patent Application Publication No. 2001-243913 (pp. 2–4, FIG. 1), for example).

With the emission bulb employing such an amalgam, the time period from the start of lighting up to the time at which output light flux quantity reaches the predetermined value is long, i.e., the emission bulb has a disadvantage of poor light quantity rising property. This is because in the event that the temperature of the emission bulb prior to lighting is low, i.e., generally the same as the room temperature, the luminance of the emission bulb is low immediately following turning on due to reduction of the mercury vapor pressure from the amalgam control, and the mercury vapor pressure increases due to the increase of the temperature of the emission bulb, and accordingly, the luminance gradually increases. As a method for improving the light quantity rising property, a technique has been proposed wherein an auxiliary amalgam formed of indium (In) or the like are provided around the filament electrode thereof so as to compensate for the shortage of the mercury vapor pressure immediately following the start of lighting (see Japanese Unexamined Patent Application Publications Nos. 60-146444 (p. 2, FIGS. 3 and 4) and 11-233065 (pp. 2–3, FIG. 1), and Japanese Examined Patent Application Publication No. 3262168 (pp. 2–6, FIG. 5), for example).

On the other hand, a bulb-shaped fluorescent lamp is known wherein a cooling portion is provided to a part of the emission bulb for improving the light quantity rising property without using an amalgam for controlling the mercury vapor pressure (see Japanese Unexamined Utility Model Registration Application Publication No. 61-63759, for example).

With the aforementioned conventional technique, the cooling portion is provided to a part of the emission bulb, and accordingly, there is no need to use an amalgam, and high mercury vapor pressure can be maintained within the emission bulb even in the event of a low temperature state when the lamp is turned off. That is to say, while the lighting device and the emission bulb is encased within a practically airtight envelope, and accordingly, the internal temperature increases within the envelope, the space within the envelope is separated into a lighting-device space and an emission bulb space by a partition so as to prevent the internal temperature from exceeding a predetermined temperature. Furthermore, an exhaust pipe disposed to the end of the emission bulb for sealing is extended to the lighting device space by 5 through 20 mm so that the temperature of the exhaust pipe is relatively low when the lamp is turned on, whereby the aforementioned cooling portion can be formed at this position.

On the other hand, with the bulb-shaped fluorescent lamp including both of the principal amalgam and the auxiliary amalgam as shown in the aforementioned Japanese Unexamined Patent Application Publications Nos. 2001-243913 (pp. 2–4, FIG. 1), 60-146444 (p. 2, FIGS. 3 and 4), and No. 11-233065 (pp. 2–3, FIG. 1), and Japanese Examined Patent Application Publication No. 3262168 (pp. 2–6, FIG. 5), the mercury migrates from the principal amalgam to the auxiliary amalgam until achieving equilibrium within the emission bulb when the lamp is turned off, and this migration requires a time period of several weeks through several months. However, the change in the mercury vapor pressure within the emission bulb is not so great during a greater part of this time period, and it has been confirmed with an experiment using the absorption method, for example, that little change in the mercury vapor pressure within the emission bulb is observed after the first ten hours following turning on have elapsed. Furthermore, the mercury vapor pressure is generally determined by the composition of the principal amalgam which causes higher mercury vapor pressure than the auxiliary amalgam at the same temperature (see proceedings No. 7, 2000 Annual Conference of Illumination Engineering Institute of Japan).

The mercury emitted from the auxiliary amalgam near the electrode accompanying lighting is diffused toward the center of the discharge path of the emission bulb in several dozen seconds following the start of lighting, following which the mercury spreads generally all over the emission bulb generally in several minutes, and the desired mercury vapor pressure can be obtained. However, an excess of the mercury vapor pressure might be caused beyond the optimal range. Subsequently, thermal equilibrium is obtained for the entire lamp generally anywhere from around ten minute to one hour, and the mercury vapor pressure becomes constant dependent upon the temperature of the principal amalgam. At this time, the auxiliary amalgam reaches 100° C., and in some cases, reaches 200° C. or more, and accordingly, all the mercury is substantially emitted from the auxiliary amalgam (to be exact, metal such as indium (In) forming the auxiliary amalgam) to which the mercury has been absorbed.

However, it is difficult to increase the mercury vapor pressure speedily immediately following turning on so as to obtain the desired luminance even in a case of a fluorescent lamp including an auxiliary amalgam, and accordingly, further improvement of the light quantity rising property is desired.

On the other hand, with the bulb-shaped fluorescent lamp including a cooling portion at a part of the emission bulb thereof as shown in Japanese Unexamined Utility Model Registration Application Publication No. 61-63759, the heat capacity within the envelope is reduced due to further reduction of the size of the bulb-shaped fluorescent lamp, and accordingly, it is difficult to form the cooling portion at a portion of the exhaust pipe even in the event that the exhaust pipe is extended into the lighting device space by around 5 through 20 mm, where the compact and narrow space within the envelope practically kept airtight is separated by the partition.

SUMMARY OF THE INVENTION

The present invention has been made in view of the above-described problems, and it is an object of the present invention to provide a bulb-shaped fluorescent lamp and an illumination device including the aforementioned bulb-shaped fluorescent lamp wherein the light quantity rising property is improved with a simple configuration, and assembly can be facilitated.

In order to attain the aforementioned object, the present invention provides a bulb-shaped fluorescent lamp comprising: an emission bulb having a bent tube; a lighting device having a circuit board and electronic parts mounted on the circuit board for outputting high-frequency electric power to the emission bulb; a cover member wherein a cap is provided on the one end side, a holder is provided on the other end for holding the emission bulb, and the lighting device is contained with the circuit board being mounted so that a great part of the electronic parts are disposed on the cap side; and a fine tube having a configuration wherein the fine tube is extended from the end of a portion of the bent tube toward the cap side within the cover member, and protrudes so that the surface temperature of a portion of the fine tube is kept in the range between 40 and 70° C. at the time of normal lighting.

In another aspect of the present invention, there is provided a bulb-shaped fluorescent lamp comprising: an emission bulb having a bent tube; a lighting device having a circuit board and electronic parts mounted on the circuit board for outputting high-frequency electric power to the emission bulb; a cover member wherein a cap is provided on the one end side, a holder is provided on the other end for holding the emission bulb, and the lighting device is contained with the circuit board being mounted so that a great part of the electronic parts are disposed on the cap side; and a fine tube extending from the end of a portion of the bent tube toward the cap side within the cover member, which protrudes from the end of the bulb by 25 to 70 mm.

In the above bulb-shaped fluorescent lamp, it is preferable that a principal amalgam is contained within the fine tube, and the principal amalgam is contained at a position close to the cap side as to the position where the electronic parts which, of the electronic parts of the lighting device, emit a relatively great quantity of heat, have been disposed.

In the above bulb-shaped fluorescent lamp, it is preferable that the circuit board has an electrolytic capacitor for smoothing as an electronic part, the lighting device converts DC output from the electrolytic capacitor into high-frequency electric power so as to be output to the emission bulb, the electrolytic capacitor is disposed on the cap side of the circuit board, a principal amalgam is contained within the fine tube, and the principal amalgam is contained so as to be positioned closer to the cap side than the electronic parts excluding the electrolytic capacitor.

Further, it is preferable that the circuit board is mounted on the cover member so as to be generally orthogonal to the longitudinal direction of the emission bulb, and the principal amalgam is contained within the fine tube so as to be positioned away from the face of the circuit board by 5 to 50 mm.

Furthermore, it is preferable that the cover member includes a globe having an opening on one end thereof, the opening side of the globe is mounted on the cover member so that the glove covers the emission bulb, an amalgam is contained within the fine tube, and the fine tube protrudes from the end of the emission bulb by 25 to 60 mm in a case of lamp input electric power in the range between 7 and 25 W.

Furthermore, it is preferable that the fine tube is extended from a portion of the bent tube toward the cap side as to electronic parts which, of the electronic parts of the lighting device, emit a relatively great quantity of heat, and a discharge medium which contains mercury and causes generally the same vapor pressure as with pure mercury is sealed within the fine tube.

Furthermore, it is preferable that the cover member includes a globe having an opening on one end thereof, the opening side of the globe is mounted on the cover member so that the glove covers the emission bulb, and the fine tube protrudes so that the surface temperature of a portion of the fine tube is kept in a range between 40 and 60° C. when the lamp normally turns on.

Furthermore, it is preferable that the cover member includes a globe having an opening on one end thereof, the opening side of the globe is mounted on the cover member so that the glove covers the emission bulb, and the fine tube protrudes from the end of the emission bulb by 25 to 70 mm in a case of the lamp input electric power in a range between 7 and 25 W.

Furthermore, it is preferable that the circuit board has an inserting portion through which the fine tube can pass, and the circuit board is mounted on the cover member so as to be generally orthogonal to the longitudinal direction of the bent tube making up the emission bulb.

Furthermore, it is preferable that a principal amalgam is sealed within the emission bulb, the content of mercury (Hg) as to the entire alloy of the principal amalgam is 3% by mass or more, and metal forming the alloy comprises at least a metal selected from a group of bismuth (Bi), lead (Pb), zinc (Zn), and tin (Sn).

Furthermore, it is preferable that an auxiliary amalgam is sealed within the emission bulb, and metal base forming the auxiliary amalgam comprises at least a metal selected from a group of gold (Au), silver (Ag), palladium (Pd), platinum (Pt), lead (Pb), zinc (Zn), bismuth (Bi), and tin (Sn), as a principal component.

Furthermore, it is preferable that the emission bulb is covered with a globe mounted on the cover member, and the maximal diameter of the globe is equal to or less than 65 mm.

Furthermore, it is preferable that the circuit board has a fine tube inserting portion for inserting the fine tube, the fine tube is formed with a diameter less than the outer diameter of the bulb of the emission bulb, the fine tube protrudes from the end of the emission bulb and has a bent portion on the middle portion thereof, the tip end portion of the fine tube from the bent portion is disposed close to the axis passing through the center of the cap as compared with the base portion of the fine tube from the bent portion on the side of the emission bulb, and an amalgam is contained within the fine tube.

Furthermore, it is preferable that the bent portion of the fine tube is disposed at a position closer to the emission bulb side than the circuit board, and the tip end portion of the fine tube is inserted into the fine tube inserting portion so as to extend on the side of the cap.

Furthermore, it is preferable that the cap is provided to one end of the cover member, and the holder for holding the emission bulb, which has an emission bulb inserting portion through which the end of the emission bulb can pass, and has a notched portion formed on the emission bulb inserting portion, is provided to the other end of the cover member, the circuit board is mounted and the cover member contains the lighting device so that a great part of the electric parts are disposed on the side of the cap, the tip end portion of the fine tube extends on the side of the cap as to electronic parts which, of the electronic parts, emit a relatively great quantity of heat, and the bent portion passes through the notched portion when inserting the end portion of the emission bulb into the emission bulb inserting portion.

Furthermore, it is preferable that the cap is provided to one end of the cover member, and the holder for holding the emission bulb, which has an emission bulb inserting portion through which the end of the emission bulb can pass, is provided to the other end of the cover member, the circuit board is mounted and the cover member contains the lighting device so that a great part of the electric parts are disposed on the side of the cap, the tip end portion of the fine tube extends on the side of the cap as to electronic parts which, of the electronic parts, emit a relatively great quantity of heat, and the bent portion is bent so that the holder does not interfere with inserting of the bent portion when inserting the end portion of the emission bulb into the emission bulb inserting portion.

Furthermore, it is preferable that the bent portion is formed so that a line passing through the center of the end portion of the emission bulb and the center of the cap, and a line passing through the center of end portion of the emission bulb and the center of the tip end portion of the fine tube, intersect at an angle in the range between −45° and +45°.

Furthermore, it is preferable that an electrolytic capacitor is mounted on the circuit board as an electronic part having a pair of leads erected on the circuit board, wherein a line passing through connectors on the circuit board for the leads making a pair, and a line passing through the base end portion and the tip end portion of the bent portion of the fine tube, are orthogonal or parallel one to another.

Further, the present invention provides an illumination device comprising: a bulb-shaped fluorescent lamp configured as above; and a device main unit for detachably mounting the bulb-shaped fluorescent lamp.

According to the above-described bulb-shaped fluorescent lamp, the size is close to that of a normal incandescent lamp, the space within the envelope containing the lighting device and the emission bulb is a narrow and airtight space. Accordingly, the heat capacity thereof is small, and consequently, the internal temperature readily becomes high. Even in the event that a part of the emission bulb formed of such a fluorescent lamp is extended toward the cap side of the cover member, the part is readily under the thermal influence thereof.

In general, a cylinder-shaped (straight-tube type) fluorescent lamp exhibits the maximal luminance efficiency with the mercury vapor pressure within the emission bulb in the range between 1 and 2.4 Pa at the time of normal lighting. With the lamp wherein pure mercury has been sealed, the temperature of a portion of the emission bulb can be kept in the range between 40 and 60° C. so that the mercury vapor pressure within the emission bulb is kept optimal. However, with the bulb-shaped fluorescent lamp which exhibits high temperature when on, it is difficult to form a portion of the emission bulb where the temperature is kept in the range between 40 and 70° C. With the present invention, a portion of the emission bulb is distanced from the discharge path, and accordingly, the temperature of the portion of the emission bulb can be kept in the range between 40 and 70° C., and thus, an amalgam which causes mercury vapor pressure generally the same as with pure mercury can be employed.

Accordingly, the present inventors had studied the temperature of the principal amalgam and the temperature of the protrusion of the emission bulb when on in order to improve the light quantity rising properties.

The temperature of the bulb-shaped fluorescent lamp, positioned so that the cap is positioned on the upper side, was measured for each part when on. As a result of the measurement, it has been found that the temperature in a space around the principal parts of the lighting device is close to 100° C., and on the other hand, a space on the cap side as to the principal parts exhibits a relatively low temperature in the range between 40 and 50° C. It is considered that air is stagnant within the containing case, and convection currents hardly occur within the cover member, and accordingly, the space close to the cap side as to the principal parts of the lighting device exhibits relatively low temperature.

Here, the principal parts of the lighting device include circuit devices such as a transistor, inductor, transformer, film capacitor, and resistor, which emit a relatively great quantity of heat and have relatively large volume, and do not include circuit devices such as an electrolytic capacitor, which have relatively large volume, and emit a relatively small quantity of heat. Accordingly, even in the event that the electrolytic capacitor is disposed so as to protrude on the cap side as to the principal parts of the lighting device, the quantity of heat emitted from the electrolytic capacitor is relatively small, and accordingly, a space around the electrolytic capacitor which has been disposed at a position close to the cap side as to the circuit devices which emit a relatively great quantity of heat when on, exhibits a relatively low temperature.

Accordingly, the portion where an amalgam which causes high mercury vapor pressure and is employed for the emission bulb that exhibits high temperature when on is sealed, and the temperature of the aforementioned amalgam, was studied.

For example, the bulb-shaped fluorescent lamp including the principal amalgam comprising Bi—In—Hg and the like, was turned on in the room at ambient air temperature of 25° C. While the temperature of the principal amalgam was in the range between 90 and 130° C. at the time of turning on, the mercury vapor pressure within the emission bulb was controlled so as to be in the range between 1 and 2.4 Pa by the sealed amalgam, and thus the optimal mercury vapor pressure was observed within the emission bulb. The principal amalgam formed of a Bi—In alloy and the like can control the mercury vapor pressure around the optimal value of 1 Pa within the emission bulb even at the time of stable lighting, which exhibits high temperature.

However, such a principal amalgam causes a mercury vapor pressure which is less than that of pure mercury by one digit or more at room temperature (25° C.), and accordingly, in the event that the bulb-shaped fluorescent lamp was turned on following the bulb-shaped fluorescent lamp being left in the room at the ambient air temperature of 25° C. for a long time after tuning off, satisfactory light quantity rising was not observed. This is because the mercury vapor pressure is around 0.1 Pa immediately following turning on, and light quantity increases corresponding to the mercury vapor pressure which increases due to heat emitted from the emission bulb.

In the event that the temperature of the principal amalgam can be kept a low temperature at the time of stable lighting, there is no need to control the mercury vapor pressure to be excessively low, and accordingly, the mercury vapor pressure immediately following turning on can be determined to be high, thereby improving the light quantity rising properties.

Accordingly, an experimental model of the bulb-shaped fluorescent lamp was assembled, wherein the fine tube as a protrusion welded to the end of the emission bulb is extended within the cover member on the cap side where the temperature is relatively low, and the principal amalgam which causes high mercury vapor pressure is disposed at a portion which exhibits a low temperature. Measurement of lighting was performed using the experimental model of the bulb-shaped fluorescent lamp. As a result of the measurement, the experimental model of the bulb-shaped fluorescent lamp exhibits the excellent light quantity rising property immediately following turning on, and the excellent light output property without reduction of light quantity at the time of stable lighting.

Next, the temperature of a portion of the fine tube (protrusion) and the length of the protrusion were studied as parameters for improving the light quantity rising properties and the light output properties at the time of stable lighting.

In order to dispose the fine tube of the emission bulb at a space which exhibits the optimal temperature in the range between 40 and 70° C. at the time of normal lighting for obtaining the maximal light output from the fluorescent lamp, there is the need to dispose the fine tube away from the emission bulb which exhibits high temperature when on, and extend the fine tube toward the cap side within the cover member where the temperature is relatively low, and there is the need for the length of the protrusion to be 25 mm or more. In the event that the length of the protrusion is less than 25 mm, the fine tube is positioned close to the emission bulb which exhibits high temperature when on, i.e., the fine tube is positioned in a space where the temperature is relatively high, and accordingly, the fine tube is readily under the thermal influence thereof.

On the other hand, in the event that the protrusion length of the fine tube of the emission bulb exceeds 70 mm, the tube length is greater than the entire length of the cover member in the height direction, and consequently, the cover member cannot contain the fine tube. Furthermore, the temperature of the internal space within the cover member on the cap side near the apex of the cover member may be a temperature lower than with the optimal mercury vapor pressure, and accordingly, reduction of the luminance efficiency might be caused due to insufficient mercury vapor pressure. As a result, the fine tube should be formed with the protrusion length between 25 to 70 mm.

However, the temperature of the portion of the fine tube may exceed 70° C. depending upon the way the bulb-shaped fluorescent lamp when on is positioned, even in the event that the fine tube is extended on the cap side within the cover member. While the fine tube is preferably extended so that the fine tube is not in contact with the inner wall of the cover member on the cap side for obtaining the temperature which causes the mercury vapor pressure for the maximal light output, an arrangement may be made wherein the fine tube is in contact with the inner wall of the cover member or the cap in order to obtain the temperature which causes the optimal mercury vapor pressure.

As described above, the fine tube (protrusion) is extended within the cover member toward the cap side by 25 to 70 mm, and accordingly, the temperature which causes the optimal vapor pressure when on can be obtained, and thus, there is no need to employ an amalgam which controls the mercury vapor pressure within the fine tube to be excessively low.

Note that while an amalgam which causes mercury vapor pressure generally the same as with pure mercury can be used, the sealed amalgam is not restricted to the aforementioned amalgam. Furthermore, the sealed principal amalgam may be positioned near the end portion of the emission bulb, or around the middle portion of the fine tube extending toward the cap side, and the sealing method or positioning method is not restricted to a particular method.

Note that while in the event that the principal amalgam is sealed, in general, an auxiliary amalgam is disposed within the emission bulb for compensating for diffusion of the mercury vapor immediately following turning on, the auxiliary amalgam is not an essential component, but rather, the present invention can be applied to an arrangement wherein the emission bulb is configured so as to provide a proper quantity of mercury vapor within the emission bulb immediately following turning on.

With the present invention, the definition of technical terms will be as described below, unless specified otherwise.

"Normal lighting" indicates the state that lighting is performed without being mounted on the lighting device (illumination device) or the like at ambient air temperature of 25° C. before turning on.

A straight glass bulb is heated and melted generally at the middle portion thereof and is bent, or a glass bulb is subjected to molding, so as to form a U-shaped bent tube. Here, the "U-shaped bent tube" indicates a bent tube wherein the glass bulb is formed so that the discharge path is bent at the bent portion, and accordingly, the discharge is bent at the position. Note that the U-shaped bent tube is not restricted to an arrangement wherein the bent portion is formed in the shape of a bow or an arc, rather, includes an arrangement wherein the bent portion is formed in the shape of a zigzag or the like. That is to say, the U-shaped bent tube indicates a glass bulb formed so that both ends of the straight portion thereof are continued so as to bend the discharge path. Furthermore, an arrangement may be made wherein a communicating tube is welded to the one ends of two straight bulb portions generally parallel one to another for communication between the two straight bulb portions, whereby a bent tube is formed, and an arrangement may be made wherein a bent tube is formed in the shape of a spiral. Note that the vent bulb is not restricted to a vent bulb formed of glass, rather, an arrangement may be made wherein a bent tube is formed of other material such as ceramics or the like, of which an airtight container which can transmit light can be formed.

With the emission bulb, an arrangement may be made wherein the emission bulb comprises a single bent tube, or an arrangement may be made wherein multiple bent tubes are connected one to another through communication tubes for communication between the multiple glass bulbs, whereby at least one discharge path is formed.

A fluorescent layer is directly or indirectly coated on the inner surface of the emission bulb. While examples of the materials forming the fluorescent layer include rare-earth metallic oxide fluorescent substance, halaphosphate fluorescent substance, and the like, the materials which form the fluorescent layer are not restricted to the aforementioned materials. However, a three-band-fluorescent substance wherein fluorescent substances which each emit light in red, blue, and green, have been mixed, is preferably employed for improving the luminance efficiency.

With the emission bulb, electrodes are sealed at both ends of the discharge path formed within the emission bulb. Examples of the electrodes include hot cathodes formed of filaments, ceramics electrodes supporting the electron-emitting material, cold cathode formed of nickel or the like, and the like.

The emission bulb is filled with a discharge medium. A mixture gas formed of an inactive gas such as argon, neon, krypton, xenon, or the like, and mercury, is employed for the discharged medium.

With the fine tube (protrusion) protruding from the bulb end so as to communicate with the emission bulb, an arrangement may be made wherein a fine tube protrudes with the same diameter as the inner diameter of the emission bulb, or with the diameter smaller than with the emission bulb. Furthermore, an arrangement may be made wherein a glass bulb with a small diameter, i.e., a fine tube is welded to the end portion of the emission bulb. Furthermore, the portion wherein the end portion of a part of the bulb extends, may be used for sealing the principal amalgam, or may be used for evacuation when manufacturing of the lamp.

The cover member is provided with a cap mounted thereon, includes a holder for holding the emission bulb, on the side opposite to the side where the cap has been mounted, and forms a space for containing the lighting device. While the holder is preferably formed as a holder having emission bulb inserting portions where the ends of the emission bulb can be inserted, separate from the cover member, an arrangement may be made wherein the holder and the cover member are formed as a single unit.

As for the cap, while in general, a screw cap which is referred to as "E-type for an incandescent lamp" is employed, the cap employed in the present invention is not restricted to the screw cap. Furthermore, the present invention is not restricted to an arrangement wherein the cap is directly mounted on the cover member, but rather, an arrangement may be made wherein the cover is indirectly mounted on the cover member, or an arrangement may be made wherein the cap is formed on the cover member.

The lighting device is contained within the cover member. The circuit board of the lighting device is contained directly or indirectly as to the cover member, and the principal face of the circuit board and the longitudinal direction of the emission bulb may be parallel one to another, or may be orthogonal one to another. Note that, while in general, the lighting device includes an electrolytic capacitor for smoothing, the present invention is not restricted to this arrangement.

According to the bulb-shaped fluorescent lamp having such a configuration, the fine tube (protrusion) protrudes from the emission bulb toward the cap side, and accordingly, pure mercury, or a principal amalgam which causes high mercury vapor pressure generally the same as with pure mercury, can be sealed. As a result, the light quantity rising properties immediately following turning on are improved as compared with a case of employing a conventional amalgam which causes low mercury vapor pressure, and also, reduction of luminance efficiency when on is suppressed.

Furthermore, with a preferable arrangement, the principal amalgam may be contained within the fine tube, with the principal amalgam positioned on the cap side away from the position where electronic parts which, of the electronic parts of the lighting device, emit a relatively great quantity of heat, have been disposed.

Furthermore, with another preferable arrangement, the circuit board may include an electrolytic capacitor for smoothing as an electronic part, the lighting device converts the DC output from the electrolytic capacitor into high-frequency electric power so as to be output to the emission bulb. On the other hand, the electrolytic capacitor is disposed on the circuit board on the cap side, the principal amalgam is contained within the fine tube, and the principal amalgam is contained so as to be positioned on the cap side as to the electric parts excluding the electrolytic capacitor.

Here, the concept of "electric parts which emit a relatively great quantity of heat" can be defined as a device wherein the surface thereof exhibits a temperature of 70° C. or more at the time of stable lighting. In this case, a device which exhibits high temperature but emits little quantity of heat is not included in the "electric part which emit a relatively great quantity of heat". The "electric part which emits a relatively great quantity of heat" is a device which causes heat loss in the lighting device, and all the "electric parts which emit a relatively great quantity of heat" cause a heat loss corresponding to 70% of the entire power loss in the circuit.

In the event that the electrolytic capacitor for smoothing of the lighting device is positioned so as to protrude on the cap side as to the principal parts of the lighting device, the lighting device is contained within the cover member with the positional relation such that the principal amalgam sealed within the end portion of the bulb is positioned on the cap side as to the electronic parts other than the electrolytic capacitor for smoothing. While in general, the lighting device includes an electrolytic capacitor for smoothing, the lighting device according to the present invention is not restricted to this arrangement.

According to the bulb-shaped fluorescent lamp having such a configuration, the principal amalgam is extended up to a space on the cap side within the cover member where the temperature is relatively low, and accordingly, an amalgam which causes high mercury vapor pressure can be employed, thereby improving the light quantity properties with a simple configuration.

Furthermore, with another preferable arrangement, the circuit board may be mounted on the cover member so as to be generally orthogonal to the longitudinal direction of the emission bulb, and the principal amalgam is contained within the fine tube so as to be positioned distanced from the face of the circuit board by 5 to 50 mm.

As to the temperature in a space within the cover member, it has been confirmed that the temperature becomes low in a space the farther from the emission bulb, as described above. Furthermore, the circuit board of the lighting device serves as a thermal insulator against heat emitted from the emission bulb, as described in the documents with regard to conventional techniques, and the temperature becomes low in a space the farther from the face of the circuit board of the lighting device.

The temperature in a space distanced from the face of the circuit board by 5 mm or more is lower than the temperature near the face of the circuit board on the emission bulb side, and the temperature in a space at a position distanced from the face of the circuit board by 10 mm or more is kept in the range around between 40 and 60° C., and accordingly, the fine tube can be disposed at the position so that the mercury vapor pressure becomes the maximal. Furthermore, the temperature in a space at a position distanced from the face of the circuit board around by 10 mm, is kept in the range around between 50 and 60° C., and accordingly, the principal amalgam can be disposed at the position where the vapor pressure becomes optimal within the emission bulb when on, thereby obtaining the maximal light output.

However, the greater the distance between the principal amalgam and the emission bulb is, the greater the size in the height direction is, leading to a large-sized bulb-shaped fluorescent lamp. Furthermore, the principal amalgam for emitting mercury is sealed within the long fine tube, and accordingly, it takes a long time to diffuse mercury vapor into the emission bulb. Accordingly, the principal amalgam contained in the fine tube is distanced from the face of the circuit board by 5 to 50 mm, preferably by 10 to 50 mm, and optimally by 15 to 40 mm. Furthermore, it is necessary that the principal mercury is contained within the cover member.

According to the bulb-shaped fluorescent lamp having such a configuration, the fine tube is extended toward the cap side, the principal amalgam sealed therewithin is positioned distanced from the face of the circuit board on the cap side direction by a predetermined distance, and accordingly, an amalgam which causes high mercury vapor pressure can be employed for the principal amalgam, thereby improving the light quantity rising properties with a simple configuration.

With another preferable arrangement, the cover member is provided with a globe having an opening on one end thereof, the opening side of the globe is attached to the cover member so as to cover the emission bulb, an amalgam is contained within the fine tube, and the fine tube protrudes from the end portion of the emission bulb in the range between 25 and 60 mm, with the lamp input power in the range between 7 and 25 W.

The small-sized bulb-shaped fluorescent lamp is formed with the size generally the same as with a normal incandescent lamp, and accordingly, a space within the envelope containing the lighting device, emission bulb, and the like, is a narrow and airtight space, and consequently, the temperature within the cover member readily becomes high. Furthermore, the tube-wall load with regard to the emission bulb readily increases due to the high efficiency and high output of the small-sized bulb-shaped fluorescent lamp. However, the quantity of heat emitted from the bulb-shaped fluorescent lamp corresponds to the lamp input power.

Accordingly, the range of the input power wherein the temperature of a portion of the fine tube protruding from the end of the bulb can be kept to a desired value with the same configuration and the same conditions other than the lamp input power was researched. With the bulb-shaped fluorescent lamp with the lamp input power less than 7 W, even in the event that the emission bulb and the like is contained within the small-sized and airtight envelope, the quantity of heat emitted from the emission bulb is not so great, and accordingly, the temperature of the amalgam sealed within the fine tube does not become so high. Accordingly, there is no need to extend the fine tube where the amalgam has been sealed, in the cap side direction so as to dispose the principal amalgam away from the emission bulb.

On the other hand, in the event that the lamp input power is equal to or greater than 25 W, there is the need to dispose the principal amalgam away from the end portion of the emission bulb which exhibits high temperature when on. However, even in the event that the fine tube is extended up to a space near the cap within the cover member so that the amalgam is positioned away from the emission bulb, the temperature of the amalgam exceeds the desired temperature due to a great quantity of heat emitted from the emission bulb when on. Accordingly, there is the need to determine the lamp input power in the range between 7 and 25 W.

According to the bulb-shaped fluorescent lamp having a such configuration, the protrusion length of the fine tube is in the range between 25 and 60 mm, and accordingly, the temperature of the principal amalgam sealed within the fine tube protruding in the cap side direction within the cover member can be kept at a temperature which causes the optimal mercury vapor pressure at the time of stable lighting. Furthermore, an amalgam which causes relatively high mercury vapor pressure can be employed for the principal amalgam, thereby improving the luminance efficiency.

Furthermore, with another preferable arrangement, the fine tube extends from the end portion of a part of the bent tube toward the cap side as to the electronic parts which, of the electronic parts of the lighting device, emit a relatively great quantity of heat, mercury is contained within the fine tube, and a discharge medium which causes generally the same vapor pressure as with pure mercury is sealed within the fine tube.

Furthermore, with another preferable arrangement, the cover member is provided with a globe having an opening on the one end, and the opening side of the globe is attached to the cover member so as to cover the emission bulb, and the fine tube protrudes so that the surface temperature of a portion of the fine tube is kept in the range between 40 and 60° C. at the time of normal lighting.

Here, the term "generally the same vapor pressure as with pure mercury" means the mercury vapor pressure is close to that of pure mercury at room temperature (25° C.).

The bulb-shaped fluorescent lamp according to the present invention is not restricted to arrangements using amalgam for controlling the mercury vapor pressure, and arrangements wherein pure mercury, or mercury serving as a mercury sealing member, is sealed in an emission bulb, may be used instead.

Here, the term "mercury sealing member" may be a titanium (Ti)-mercury (Hg) alloy such as an article manufactured by SAES Getters under the product name of "GEMEDIS", mercury alloy such as zinc (Zn) amalgam which does not adsorb mercury to an extent that affects the light output while the emission bulb is on, and essentially does not control the mercury vapor pressure, and also mercury capsules which are formed of an inorganic material such as glass or ceramics or the like with liquid mercury stored therein, and so forth.

Such mercury sealing members discharge mercury into the emission bulb by being externally heated following being sealed into the emission bulb. Accordingly, the emission bulb does not have the mercury vapor pressure controlled by the principal amalgam, so the mercury vapor properties are generally the same as an arrangement such as a common fluorescent lamp wherein pure mercury is sealed in.

With the bulb-shaped fluorescent lamp according to the above-described configuration, the fine tube protrudes to the space at the cap side within the cover member, enabling formation of a cooling portion at the time of stable lighting, thereby exhibiting vapor pressure properties generally the same as with pure mercury, so light quantity rising properties can be improved with a simple configuration without loosing light output during stable lighting.

Also, with another suitable arrangement, the cover member may include a globe having an opening on one end thereof, with the opening side of the globe mounted on the cover member so that the globe covers the emission bulb, and with the fine tube protruding from the end of the emission bulb by 25 to 70 mm in a case of lamp input electric power in the range between 7 and 25 W.

With the bulb-shaped fluorescent lamp according to the above-described configuration, the fine tube protrudes by a predetermined length, so pure mercury or amalgam close to pure mercury can be used, whereby the mercury vapor pressure in the off temperature state is higher than with cases using conventional amalgam with low mercury vapor pressure, meaning that light quantity rising properties immediately following turning on are improved, and also deterioration in light-emission efficiency while on can be suppressed.

Further, with yet another suitable arrangement, the circuit board has an inserting portion through which the fine tube can pass, and the circuit board is mounted on the cover member so as to be generally orthogonal to the longitudinal direction of the bent tube making up the emission bulb.

The thermal shielding advantages of the circuit board of the lighting device can be obtained in a more sure manner by the face of the circuit board being disposed so as to be generally orthogonal to the longitudinal direction of the emission bulb, and by the end portion of the bulb extending to the cap side through an inserting portion formed in the circuit board in the form of a through hole or a notch for a tip end portion of the bulb to extend to the cap side. Particularly, the heat discharged from the emission bulb is efficiently shielded as compared to cases wherein the circuit board is disposed in a direction generally orthogonal to the longitudinal direction of the emission bulb, and the center space portion encompassed by the bent tube is not covered by the circuit board, and heat is transmitted to the cap side space less readily. Further, the fine tube protrudes through the inserting portion, so the thermal insulation advantages are not greatly impeded. At this time, the gap between the inserting portion and the fine tube should be as small as possible, preferably 1 mm or less.

In the event that the longitudinal direction of the emission bulb and the circuit board face are generally orthogonal, a fluorescent lamp wherein the emission bulb is formed of multiple bent tubes in an array with multiple end portions on the emission bulb, for example, having the circuit board to cover a part of the imaginary face formed by the ends of the emission bulb necessitating thermal insulation is sufficient, but sufficient thermal insulation effects can be obtained by arrangement for all end portions to be covered by the circuit board face.

According to the above-described configuration, the circuit board is mounted on the cover member so as to be generally orthogonal to the longitudinal direction of the emission bulb, and the fine tube is extended to the cap side through the inserting portion formed in the circuit board, so the temperature of the fine tube can be set to a desired temperature without raising the temperature within cover member on the cap side.

Further, with yet another suitable arrangement, a principal amalgam is sealed within the emission bulb, the content of mercury (Hg) as to the entire alloy of the principal amalgam is 3% by mass or more, and metal forming the alloy comprises at least a metal selected from a group of bismuth (Bi), lead (Pb), zinc (Zn), and tin (Sn).

As for the principal amalgam sealed within the fine tube, amalgam is used which has properties wherein the mercury vapor pressure immediately following turning on is close to that of pure mercury, and wherein the mercury vapor pressure during stable lighting can be controlled to a proper value. For example, an amalgam is preferably used wherein the mercury vapor pressure when the temperature of the principal amalgam is 25° C. is in the range of 0.1 Pa to 0.24 Pa, and more preferably in the range of 0.15 Pa to 0.24 Pa, wherein the mercury vapor pressure when the temperature of the principal amalgam is 50° C. to 60° C. is in the range of 1.0 Pa to 2.0 Pa.

Now, at the time of sealing of the principal amalgam, auxiliary amalgam is preferably sealed in to supplement the diffusion of mercury vapor immediately following turning on, but this auxiliary amalgam is not indispensable, and an arrangement wherein only the principal amalgam is sealed in is sufficient as long as the emission bulb is configured such that suitable diffusion of mercury vapor occurs within the emission bulb immediately after turning on.

While the mercury vapor properties of the principal amalgam are determined by the composition of the amalgam-forming metal and the amount of mercury contained, optimal amalgam forming metals are bismuth (Bi), lead (Pb), zinc (Zn), and tin (Sn). Examples include, but are not restricted to, bismuth (Bi)-tin (Sn)-mercury (Hg), bismuth (Bi)-tin (Sn)-lead (Pb)-mercury (Hg), and tin (Sn)-mercury (Hg). Mercury component of 3% or more by mass as to the entire mass of the principal amalgam is effective in improving the light quantity rising properties, since the amount of mercury precipitating on the surface of the principal amalgam is great.

As for the mercury to be sealed into the emission bulb, amalgam is preferably sealed within the bulb-shaped fluorescent lamps which are lit under high-temperature environments, but the present invention is not restricted to this.

According to the above-described bulb-shaped fluorescent lamp, the light quantity rising properties can be further improved by optimizing the composition of the primary (principle) amalgam.

Further, with yet another suitable arrangement, an auxiliary amalgam is sealed within the emission bulb, and a metal base forming the auxiliary amalgam comprises at least a metal selected from a group of gold (Au), silver (Ag), palladium (Pd), platinum (Pt), lead (Pb), zinc (Zn), bismuth (Bi), and tin (Sn) as the primary component thereof.

With the present invention, the auxiliary amalgam disposed in the emission bulb can be optimized. First, the light quantity rising properties of a bulb-shaped fluorescent lamp having the emission bulb wherein primary amalgam is disposed on the cap side and auxiliary amalgam is not provided, were inspected. The results show that while a certain brightness can be obtained immediately following turning on, the light quantity then drops and a lit state with reduced light quantity continues for a while, and after several minutes, the lamp enters a stable lighting state due to the mercury vapor pressure controlled by the principal amalgam. This phenomenon is thought to be due to the mercury vapor being adsorbed on the inner face of the bulb, which results in a temporary state wherein the mercury vapor within the discharge space is insufficient.

That is to say, upon the lamp being turned on, the residual liquid mercury within the bulb evaporates into the discharge space and becomes mercury vapor, but the fluorescent substance on the inner side of the bulb, the protective film material, the glass face, and so forth, tend to adsorb mercury vapor, so a lack of mercury vapor occurs in the event that the amount of adsorption is greater than the amount of mercury evaporating, leading to the phenomenon wherein the emission bulb is lit but the light quantity thereof is reduced.

This phenomenon does not readily occur with an arrangement wherein the fine tube sealing the end portion of the emission bulb with a conventional bulb-shaped fluorescent lamp is made to protrude 5 to 15 mm, with the principal amalgam sealed into the fine tube of which the tip portion does not reach the circuit board. In contrast, this phenomenon readily occurs in cases wherein the principal amalgam protrudes to the cap side. That is to say, in the event that the principal amalgam is disposed on the cap side, the mercury discharged form the principal amalgam is carried through the emission bulb to the discharge space by density distribution. The mercury vapor diffusion path is long in the fine tube portion between the primary amalgam and the discharge space, and is relatively small in diameter, so the diffusion speed is very slow, and consequently, a lighting state continues for several minutes wherein the emission bulb appears to dimly glow.

Accordingly, using auxiliary amalgam in the emission bulb was studied in order to provide means for supplying mercury vapor immediately following turning on, having a certain amount of mercury in the discharge path when the bulb-shaped fluorescent lamp is off. First, in order to examine the light output properties, the composition of the primary amalgam and the auxiliary amalgam, and the length of the fine tube, were changed in various ways, and the overall light quantity and light quantity rising properties were measured.

The results showed that the entire light quantity can be normalized for stable lighting with bulb-shaped fluorescent lamps having primary amalgam with high mercury vapor pressure disposed on the cap side, but that there are differences in the effects of improving light quantity rising properties depending on the composition of the auxiliary amalgam. This is due to the length of the small-diameter mercury vapor diffusion path since the principal amalgam is situated further on the cap side from the lighting device thorough the fine tube, so the mercury vapor pressure within the emission bulb immediately after turning on tends to be governed by the mercury adsorbability of the auxiliary amalgam.

With a case of a conventional bulb-shaped fluorescent lamp, the mercury vapor pressure within the emission bulb immediately following turning on is generally determined by the mercury vapor properties of the primary (principal) amalgam, since the small-diameter mercury vapor diffusion path is around 5 to 15 mm in length. Conversely, with bulb-shaped fluorescent lamps wherein the principal amalgam is disposed on the cap side, the mercury vapor pressure within the emission bulb immediately following turning on is thought to be readily determined by the mercury vapor properties of the auxiliary amalgam.

Next, optimization of the auxiliary amalgam was studied. It is important that the auxiliary amalgam does not greatly decrease the mercury vapor pressure. That is, metals such as indium (In) conventionally used for the auxiliary amalgam are unsuitable since the mercury adsorption capabilities are high and mercury vapor is not readily discharged immediately following turning on, so a metal which does not adsorb much mercury has been found to actually be more preferably for the auxiliary amalgam.

Examples of materials optimal for such auxiliary amalgam may include gold (Au), silver (Ag), palladium (Pd), platinum (Pt), lead (Pb), zinc (Zn), bismuth (Bi), tin (Sn), and so forth. Particularly, gold (Au) and silver (Ag) are suitable from the perspective of mercury adsorption. For example, in the case of a 12 W class bulb-shaped fluorescent lamp equivalent to a 60 W incandescent light bulb, the optimal mercury vapor within the emission bulb is around 2 μg when converted into mass, so an auxiliary amalgam which is capable of adsorbing around 20 μg of mercury, which is 10 times the above mass ratio, is sufficient.

The auxiliary amalgam may be configured of gold or silver foil, or may be electroplated on the surface or wells of a base such as stainless steel, and is attached to a desired position near the electrode or in the discharge path. Note that the primary component of the metal base making up the auxiliary amalgam is metal which makes up the amalgam by adsorption of mercury within the emission bulb being metal coated on the surface of a heat-resistant metal plate such as stainless steel, iron-nickel alloy, etc., by electroplating, coating, vapor deposition, or the like, and the base portion upon which the electroplating, coating, or vapor deposition is performed is not included in this.

According to the bulb-shaped fluorescent lamp having the above-described configuration, the composition of the auxiliary amalgam is optimized, so even in the event that the principal amalgam is disposed on the cap side, deterioration in light quantity due to lack of mercury immediately following turning on is suppressed, so light quantity rising properties can be improved in a sure manner.

Further, with yet another suitable arrangement, the emission bulb may be covered with a globe mounted on the cover member, and the maximal diameter of the globe may be equal to or less than 65 mm.

The globe which covers the emission bulb may be either light diffusive or transparent, as long as it is light transmissive, and may be patterned or colored. The material of the globe may be either glass or plastic. While the shape of the globe is optional, shapes which can be used include so-called the A-type which is close in shape to the commonly-used incandescent light bulb, the G-type which is almost spherical, and the T-type which is cylindrical with a spherical tip.

In the event of using bulb-shaped fluorescent lamps with such globes, the temperature of the space within the cover member tends to rise, so there is the need to use amalgam with low mercury vapor pressure, and the light quantity rising properties of such bulb-shaped fluorescent lamps has been particularly poor.

However, with the bulb-shaped fluorescent lamp according to the present invention as described above, the principal amalgam is positioned on the cap side, so amalgam with high mercury vapor pressure can be used even for bulb-shaped fluorescent lamps with globes, hereby markedly improving the light quantity rising properties.

Also, the present inventors prepared an emission bulb wherein the tip portion of the fine tube is extended to as to be positioned on the cap side, and created an experimental model bulb-shaped fluorescent lamp wherein principal amalgam with relatively high mercury vapor pressure is sealed in the fine tube so as to be positioned further on the cap side as to the principal components of the lighting device, and the lamp was turned on. The light quantity rising immediately following turning on was satisfactory, and light output properties with no deterioration in light quantity during stable lighting were obtained.

Also, the temperature within the cover member was confirmed to be lower the farther distanced from the circuit board face of the lighting device. This is thought to be due to the circuit board of the lighting device serving to shield radiant heat from the emission bulb. Actually, the temperature in space distanced from the circuit board face by 5 mm or more was lower than the temperature near the circuit board face on the emission bulb side, and the temperature in the space distanced from the circuit board face by 10 mm or more was around 40° C. to 60° C., so positioning the principal amalgam in this space is optimal.

However, the longer the distance is from the principal amalgam to the emission bulb, the greater the height-wise dimensions of the overall lamp are, thereby increasing the size of the bulb-shaped fluorescent lamp, and also requiring longer time for diffusion of mercury vapor from the principal amalgam to the emission bulb. Accordingly, the principal amalgam should be within 50 mm from the face of the board, and more preferably within 40 mm.

In this case, a bent portion is preferably provided at the middle portion of the fine tube, so that the tip side portion from the bent portion is disposed near the axial line passing through the center of the cap, as to the base portion on the emission bulb side of the bent portion. This allows the tip side portion to come close to the axial line side and extend the tip side portion to the cap side while preventing the fine tube from coming into contact with the cover member, so the distance of the principal amalgam from the board face can be sufficiently secured while preventing increase in size of the fluorescent lamp.

The thermal insulating effects of the circuit board of the lighting device can be obtained in a sure manner by the circuit board covering the end portion of the emission bulb, and the tip side portion of the fine tube being extended to the cap side through a fine tube inserting portion formed in the circuit board as a through hole or a notch. Particularly, covering all of the emission bulb with the circuit board prevents transmission of heat to the space at the cap side by the radiant heat of the emission bulb being efficiently shielded as compared to cases wherein the entire end portion of the emission bulb is not covered. At this time, disposing the bent portion on the emission bulb side from the circuit board, and also positioning the fine tube by inserting the tip side portion through the fine tube inserting portion so as to be extended to the cap side, allows the size of the fine tube inserting portion to be formed at a size whereby the tip side portion of the fine tube can be inserted through, thereby preventing the thermal insulating effects from being greatly lost.

In this case, the distance between the fine tube inserting portion and the fine tube should be as small as possible, preferably 1 mm or less. Also, with regard to covering the entire end portion of the emission bulb, in the event that multiple end portions are formed on the emission bulb, there is no need to completely cover the entire end face of all of the end portions, rather, covering a portion of the end face of the end portions of the emission bulb necessary for thermal insulating by the circuit board is sufficient. For example, in the event that the emission bulb has an array of multiple bent tubes, sufficient thermal insulation effects can be obtained even without covering the portion of the emission bulb further outside from the center axis of the bulb.

Further, thermal insulation effects by the circuit board of the lighting device can also be obtained by covering the end portion of the emission bulb with the circuit board, and extending the tip side portion and bent portion of the fine tube to the cap side through the fine tube inserting portion formed in the circuit board as a through hole or notch or the like. In this case as well, the gap between the fine tube inserting portion and the fine tube should be as small as possible, preferably 1 mm or less.

Also, in order to prevent the radiant heat from the emission bulb from being transmitted to the cap side within the cover member, the distance between the emission bulb and the emission bulb inserting portion formed in the holder should be as small as possible, preferably 1 mm or less.

In the event that a smoothing electrolytic capacitor of the lighting device is disposed so as to protrude to the cap side farther than the primary components of the lighting device, the lighting device is preferably stored within the cover member in a positional arrangement wherein the principal amalgam sealed in the fine tube is positioned farther on the cap side than the electronic parts excluding the smoothing electrolytic capacitor.

Also, in the event that the circuit board of the light device is positioned so as to shield the radiant heat of the emission bulb, the principal amalgam sealed into the fine tube is preferably stored within the cover member at a position 5 to 50 mm from the circuit board face, preferably 10 to 50 mm, and optimally 15 to 40 mm.

Further, with yet another suitable arrangement, the bent portion may be formed so that a line passing through the center of the end portion of the emission bulb and the center of the cap, and a line passing through the center of end portion of the emission bulb and the center of the tip portion of the fine tube, intersect at an angle in the range between −45° and +45°.

According to the invention configured as described above, the tip side portion of the fine tube storing the amalgam is positioned in the space of the cover member toward the cap side where the temperature is relatively low, so amalgam having high mercury vapor pressure properties can be used, and accordingly light quantity rising properties can be improved with a simple configuration.

Particularly, in the event of disposing the bent portion provided at the middle of the fine tube farther on the emission bulb side as to the circuit board, and extending the tip side portion from the bend portion through the fine tube inserting portion so as to be extended to the cap side, assembly is facilitated, and deterioration of thermal shielding effects by the circuit board can be suppressed.

That is to say, with a bulb-shaped fluorescent lamp wherein the tip side portion as to the bent portion of the fine tube is positioned closer to the axial line passing through the center of the cap than the base portion closer to the emission bulb than the bent portion, wherein the bent portion is positioned farther toward the cap than the circuit board and wherein the tip side portion as to the bent portion of the fine tube is extended through the fine tube inserting portion to the cap side within the cover member, the fine tube inserting portion must be formed large enough for the bent portion to pass through. However, such a configuration makes the size of the fine tube inserting portion greater than the size necessary for inserting the tip end side portion as to the bent portion of the fine tube, resulting in a gap between the fine tube and the fine tube inserting portion in a state wherein the tip side portion is extended to the cap side of the cover member, which reduces the thermal insulating effects of the circuit board of the light device.

On the other hand, the fine tube inserting portion can be designed to be somewhat smaller by inserting the tip side portion of the fine tube through the fine tube inserting portion at an angle to the axial line passing through the center of the cap, and subsequently directing the tip side portion in a direction parallel to the axial line, thereby extending the tip side portion to the cap side of the cover member. However, even this arrangement does not allow for the size of the fine tube inserting portion to be reduced to a size through which only the tip side portion of the fine tube can pass. Moreover, there is the need to change the direction of the tip side portion while inserting the fine tube through the fine tube inserting portion as described above, so assembly is troublesome.

However, positioning the bent portion on the emission bulb side of the board, and inserting the tip side portion of the fine tube through the fine tube inserting portion to be extended to the cap side allows for the size of the fine tube inserting portion to be a size through which only the tip side portion of the fine tube can pass, so deterioration of thermal shielding effects by the circuit board can be suppressed. Moreover, the fine tube can be inserted through the fine tube inserting portion without tilting the fine tube, and accordingly assembly is facilitated.

Further, with yet another suitable arrangement, a notched portion may be formed on the emission bulb inserting portion, so that upon inserting the end portion of the emission bulb thorough the emission bulb inserting portion, the bent portion is passed through this notch. Accordingly, even in the event that the bent portion of the tine tube is a shape which would not fit in the emission bulb inserting portion, the bent portion can be passed through emission bulb inserting portion and the notch without tilting the emission bulb and fine tube, so assembly is facilitated. Moreover, there is no need to design the emission bulb inserting portion larger than a size necessary for the end of the emission bulb to pass through, or to form a notch on the emission bulb inserting portion, so there is little reduction in thermal insulating effects by the holder.

Further, with yet another suitable arrangement, the bent portion of the fine tube may be formed so that a line passing through the center of the end portion of the emission bulb and the center of the cap, and a line passing through the center of end portion of the emission bulb and the center of the tip portion of the fine tube, intersect at an angle in the range between −45° and +45°, so that the insertion of the end portion of the emission bulb through the emission bulb inserting portion is not impeded by the holder. Accordingly, the emission bulb and the fine tube can be inserted through the emission bulb inserting portion without tilting them, thereby facilitating assembly.

Further, with yet another suitable arrangement, of the electronic parts mounted on the circuit board, an electrolytic capacitor may have a pair of leads erected on the circuit board, wherein a line passing through connectors on the circuit board for the pair of leads, and a line passing through the base end portion and the tip end portion of the bent portion of the fine tube, are orthogonal one to another.

Now, the concept of "a line passing through connectors on the circuit board for the pair of leads, and a line passing through the base end portion and the tip end portion of the bent portion of the fine tube, are orthogonal one to another" means that the lines are essentially orthogonal, and offset occurring due to manufacturing and so forth are within a permissible range. Also, the line passing through connectors on the circuit board for the pair of leads and the line passing through the base end portion and the tip end portion of the bent portion of the fine tube, do not necessarily need to be orthogonal one to another, and may be in a twisted relationship. It is sufficient that the relationship between the bent portion and the leads be in a position wherein the line passing through connectors on the circuit board for the pair of leads and the line passing through the base end portion and the tip end portion of the bent portion of the fine tube are off by 90° one to another as viewed from the cap side.

Further, with a suitable arrangement, a line passing through connectors on the circuit board for the pair of leads, and a line passing through the base end portion and the tip end portion of the bent portion of the fine tube, may be orthogonal one to another. Accordingly, even in the event that the fine tube comes into contact with the electrolytic capacitor during assembly of the lamp, the leads bend and the electrolytic capacitor readily move away from the fine tube, so the connectors on the circuit board for the leads are not easily twisted or deformed, thereby preventing loose electrical connections between the electrolytic capacitor and the other electronic parts.

Further, with yet another suitable arrangement, of the electronic parts mounted on the circuit board, an electrolytic capacitor may have a pair of leads erected on the circuit board, wherein a line passing through connectors on the circuit board for the leads making a pair, and a line passing through the base end portion and the tip end portion of the bent portion of the fine tube, are parallel one to another.

Now, the concept of "a line passing through connectors on the circuit board for the leads making a pair and a line passing through the base end portion and the tip end portion of the bent portion of the fine tube are parallel one to another" means that the lines are essentially parallel, and offset occurring due to manufacturing and so forth are within a permissible range.

Also, the invention as described above is configured such that a line passing through connectors on the circuit board for the leads making a pair and a line passing through the base end portion and the tip end portion of the bent portion of the fine tube are parallel one to another. Accordingly, even in the event that the fine tube comes into contact with the electrolytic capacitor during assembly of the lamp, the leads do not bend easily and the electrolytic capacitor does not tilt, so the electrolytic capacitor can be prevented from coming in contact with the cover member at the time of storing the lighting device in the cover member, which would interfere with the storage work.

Also, an illumination device according to the present invention comprises any of the bulb-shaped fluorescent lamps prepared as described above, and a device main unit for detachably mounting the bulb-shaped fluorescent lamp.

The device main unit may be a pre-existing lighting device main unit. The illumination device only needs to comprise a device main unit such as an embedded device like a downlight or a surface-mounted device, and one of the bulb-shaped fluorescent lamps prepared as described above.

The illumination device with the above-described configuration can provide an illumination device comprising a bulb-shaped fluorescent lamp whereby light quantity rising properties can be improved with a simple structure, and further which is easy to assemble.

BRIEF DESCRIPTION OF THE DRAWINGS

FIG. 5A through FIG. 5E are side views which illustrate a configuration of a fine tube which the fluorescent lamp includes shown in FIG. 1;

FIG. 8 is a partial cross-sectional diagram for describing the temperature distribution with regard to the fluorescent lamp shown in FIG. 1 when the lamp is turned on;

FIG. 9 shows a chart for describing the light quantity rising property of the fluorescent lamp shown in FIG. 1 when the lamp is turned on;

DESCRIPTION OF THE PREFERRED EMBODIMENTS

Description will be made below regarding a first embodiment of the present invention with reference to FIGS. 1 through 9.

Figure 1:
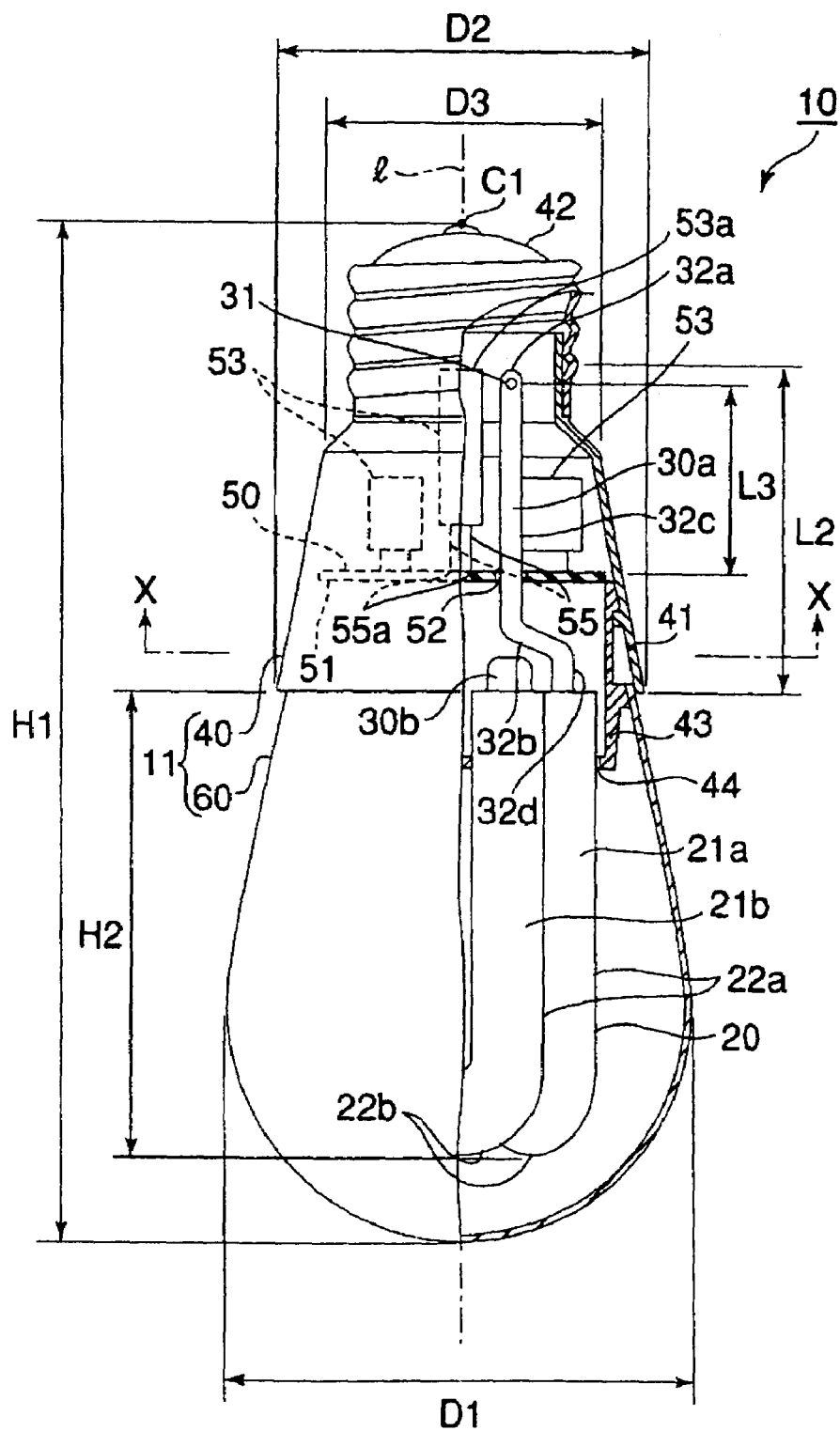
FIG. 1 is a partial cross-sectional diagram which illustrates a bulb-shaped fluorescent lamp according to a first embodiment of the present invention.

As shown in FIG. 1, a bulb-shaped fluorescent lamp 10 comprises an emission bulb 20, fine tubes 30a to 30c, a cover member 40, a lighting device 50, and a globe 60. The cover member 40 includes a cover main unit 41, a cap 42 provided to one end of the cover main unit 41, and a holder 43 provided to the other end of the cover main unit 41. The cover main unit 41 and the holder 43 are formed of thermally stable plastic such as polybutylene terephthalate (PBT) or the like, for example. With the cover main unit 41, the lower portion thereof is generally in the shape of a truncated cone which expands along the longitudinal axis from the upper end to the lower end, and the upper portion thereof is generally in the shape of a cylinder, and the aforementioned two portions are formed as a single unit. The cap 42 generally in the shape of a cylinder is mounted to the generally-cylindrical portion of the cover main unit 41, and is fixed by means of adhesion, caulking, or the like. Furthermore, the cover main unit 41 has a space therewithin generally in the shape of a truncated cone for containing the lighting device.

An envelope 11 made up of the cover member 40 and the globe 60 is formed in an external shape and size similar to a normal illuminating bulb such as an incandescent lamp or the like having a rated power of 60-W. That is to say, the envelope is formed with a height H1 including the cap 42 of around 110 to 125 mm, with an outer diameter D1 of the globe 60 of around 50 to 60 mm, and with an outer diameter D2 of the cover member 40 of around 40 mm. Note that the normal illuminating bulb is stipulated by Japanese Industrial Standard (JIS C 7501).

An alumina ($Al_2O_3$) passivation film (not shown) is formed on the inner surface of the emission bulb 20, and a fluorescent layer (not shown) is further formed thereon. The fluorescent layer is formed of a three-band-fluorescent substance wherein fluorescent substances which each emit light in red, blue, and green, have been mixed, for example. As a red-luminescence-fluorescent substance, a europium-activated yttrium oxide fluorescent substance ($Y_2O_3$:$Eu^{3+}$) with a peak wavelength of around 610 nm, and the like are known. As a blue-luminescence-fluorescent substance, a europium-activated barium magnesium aluminate fluorescent substance ($BaMg_2Al_{16}O_{27}$:$Eu^{2+}$) with a peak wavelength of around 450 nm, and the like are known. As a green-luminescence-fluorescent substance, a cerium/terbium-activated lanthanum phosphate fluorescent substance ((La, Ce, Tb) $PO_4$) with a peak wavelength of around 540 nm, and the like are known. Note that, with the three-band-fluorescent substance, an arrangement may be made wherein fluorescent substances other than the aforementioned fluorescent substances which each emit light in red, blue, and green, which emit light in other colors, are mixed so as to emit light in desired color. Note that the fluorescent layer is coated and formed on the emission bulb 20 following formation of bent tubes 21a, 21b, and 21c, described later.

Figure 2:
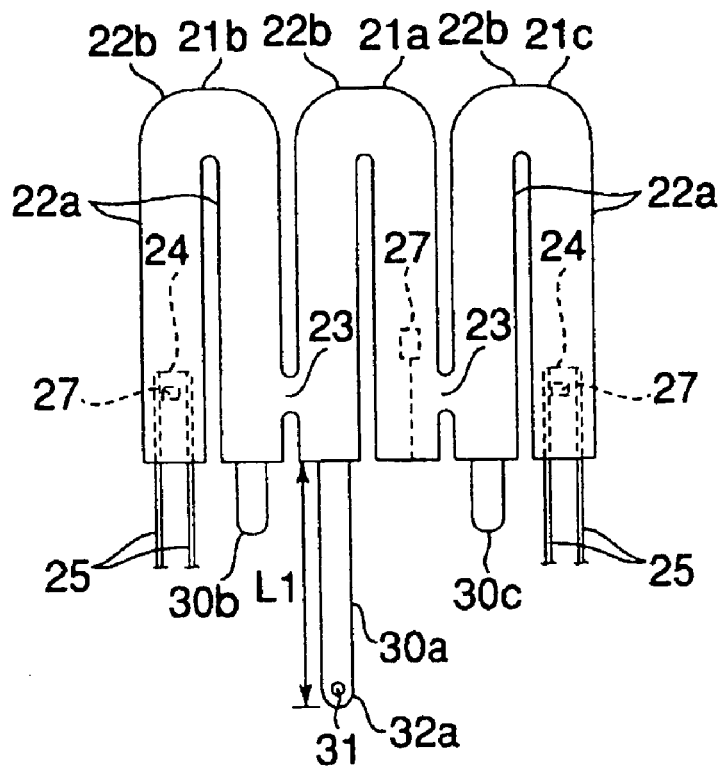
FIG. 2 is a development diagram for describing a configuration of an emission bulb which the fluorescent lamp shown in FIG. 1 includes.
Figure 3:
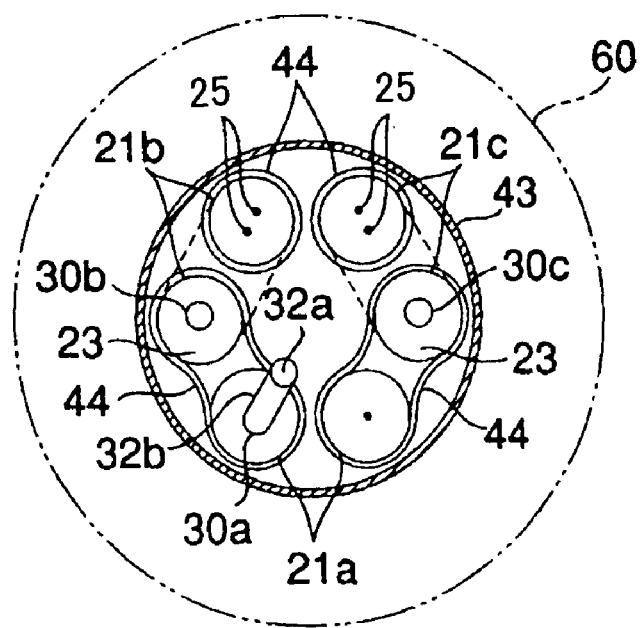
FIG. 3 is a cross-sectional view taken along line X—X of FIG. 1.

The emission bulb 20 includes multiple bent tubes generally in the same external shape, e.g., three bent tubes 21a, 21b, and 21c, as shown in FIG. 2 or FIG. 3. These bent tubes 21a, 21b, and 21c, are disposed in predetermined positions, and are serially connected through communication pipes 23, whereby a single discharge path is formed.

The three bent tubes 21a, 21b, and 21c each have a pair of straight tubes 22a generally parallel one to another, and a curved tube 22b for connecting the one ends of the straight tubes 22a making a pair, whereby the bent tubes are formed U-shaped. These bent tubes 21a, 21b, and 21c, are arranged so that straight tubes 22a form a circle, and three curved tubes 22b are positioned in the shape of a triangle. Note that an arrangement may be made wherein four bent tubes are arranged so that the curved tubes 22b are positioned in the shape of a quadrilateral.

The bent tubes 21a, 21b, and 21c, are each formed of a nonleaded glass tube with the outer diameter of approximately 11 mm, the inner diameter of approximately 9.4 mm, and the thickness of approximately 0.8 mm. A straight glass bulb with the length of around 110 to 130 mm is bent so as to form a smoothly-curved portion at the middle portion thereof, whereby each bent tube is formed. With the curved tubes 22b of the bent tube 21a, 21b, and 21c, following heating the middle portion of the straight glass bulb so as to be bent, the bent portion is molded under the increased pressure inside the bulb, whereby the bent tube is formed in a desired shape. The curved tube can be formed in desired shapes by altering the shape of the mold.

Note that the bent tubes 21a, 21b, and 21c, are preferably formed with the outer diameter of 9.0 to 13 mm, with the thickness of 0.5 to 1.5 mm. Furthermore, the emission bulb 20 is preferably formed with the discharge path length in the range between 250 and 500 mm, and the lamp input power is preferably determined in the range between 8 to 25 W. The bent tubes 21a, 21b, and 21c, readily deform due to heating in manufacturing and the difference in temperature from lighting, and the conditions under which reduction of mechanical strength of the communication pipes 23 occurs greatly depend upon the relation between the outer diameter and the thickness of the glass bulb used.

In the event that the glass bulb is formed with the outer diameter less than 9.0 mm, or with the thickness less than 0.5 mm, the emission bulb 20 itself is readily broken due to the factors other than deforming of the bent tubes 21a, 21b, and 21c, and accordingly, a glass bulb having such a structure is not preferable. In the event that the glass bulb is formed with the outer diameter exceeding 13 mm, or with the thickness exceeding 1.5 mm, a certain degree of mechanical strength of the communication pipes 23 can be obtained. With the emission bulb 20 formed of glass bulbs with the outer diameter of 9.0 to 13 mm, and the thickness of 0.5 to 1.5 mm, the discharge path length is designed in the range between 250 and 500 mm, and the lamp input power is determined in the range between 8 and 25 W, and thus, the bulb-shaped fluorescent lamp 10 can be configured, similar to an incandescent lamp. Furthermore, as a result of study of the lighting range wherein the lamp efficiency of the emission bulb 20 is improved by extending the discharge path length, it has been found that the lamp efficiency is particularly improved with the discharge path length in the range between 250 and 500 mm, and with the lamp input power in the range between 8 and 25 W.

In general, a lead component is mixed into the glass to be used for the bent tubes 21a, 21b, and 21c, for reducing the glass-transition temperature in order to facilitate the heating process thereof, but the lead component is harmful to the environment, so use of the lead component should be minimal. Furthermore, while a great amount of sodium components ($Na_2O$) are mixed in the glass to be used for the bent tubes 21a, 21b, and 21c, as an alkaline component, it is considered that the sodium components are deposited, and react with the fluorescent substance, leading to deterioration of fluorescent substance. Accordingly, the bent tubes 21a, 21b, and 21c are formed of glass with substantially no lead components, and with the content of $NaO_2$ of 10% by mass or less, and accordingly, the harmful effects on the environment are reduced, and furthermore, deterioration of the fluorescent substance is prevented, so light emission deterioration can also be prevented.

The glass used for the bent tubes 21a, 21b, and 21c are formed of $SiO_2$ in the range between 60 and 75% by mass, $Al_2O_3$ in the range between 1 and 5% by mass, $Li_2O$ in the range between 1 and 5%, $Na_2O$ in the range between 5 and 10% by mass, $K_2O$ in the range between 1 and 10% by mass, CaO in the range between 0.5 and 5% by mass, MgO in the range between 0.5 and 5% by mass, SrO in the range between 0.5 and 5% by mass, and BaO between 0.5 and 7% by mass, wherein the relations $SrO/BaO \geq 1.5$ and $MgO+BaO \leq SrO$ are satisfied. It has been confirmed that the emission bulb 20 made up of the bent tubes 21a, 21b, and 21c, formed of the above-described glass has improved light quantity rising property as compared with an emission bulb which is the same except for being formed of leaded glass, although the reason is unknown.

The one ends of the bent tubes 21a, 21b, and 21c are sealed with pinch seals or the like, and the fine tubes 30a to 30c with the outer diameter of 2 to 5 mm, the inner diameter of 1.2 to 4.2 mm, are sealed to the other ends thereof with pinch seals or the like so that the fine tubes are protruded from the end of the emission bulb 20. The fine tube 30b of the bent tube 21b, which has been disposed at the one end, is a dummy, and the fine tube 30c of the bent tube 21c disposed at the other end is for evacuation of the emission bulb 20 in manufacturing of the lamp. Furthermore, in the fine tube 30a disposed at the middle portion of the bent tube 21a, a principal amalgam 31 is sealed.

With the one ends of the bent tube 21b and 21c positioned on both sides of the emission bulb 20 on the sides where the communication tubes are not disposed, filament coils serving as electrodes 24 are each held by a pair of wells. The one pair of wells is connected to wires 25 led externally from the bent tubes 21b and 21c through dumet wires sealed to the one ends of the bent tubes 21b and 21c on the both sides with pinch seals or the like without using mounts. The four wires 25, making up two pairs, led from the emission bulb 20 are electrically connected to a lighting device 50.

Auxiliary amalgams 27 are provided to the one end of the intermediate bent tube 21a and the wells 25 near the electrodes 24. The auxiliary amalgam 27 provided to the intermediate bent tube 21a is mounted on the wells 25 sealed with a pinch seal or the like, and is disposed at the middle position of the discharge path.

Note that, with the present embodiment, the auxiliary amalgam 27 preferably does not cause great reduction of the mercury vapor pressure. That is to say, a metal such as indium (In) is not preferably employed due to high capabilities for absorption of mercury, and due to the fact that it is difficult for a proper quantity of mercury vapor to be emitted immediately following turning on, so rather, a metal not having high capability for absorption of mercury is preferably employed in the auxiliary amalgam 27.

Examples of optimal metals forming this kind of the auxiliary amalgam include gold (Au), silver (Ag), palladium (Pd), platinum (Pt), lead (Pb), zinc (Zn), bismuth (Bi), tin (Sn), and the like. In particular, gold (Au) and silver (Ag) are preferably employed from the point of adsorptive power for mercury. In a case of a 12-W bulb-shaped fluorescent lamp 10 corresponding to a 60-W incandescent lamp, a metal which can absorb ten times as much mercury by mass as that providing the optimal mercury vapor pressure within the emission bulb 20 is sufficient for being employed in the auxiliary amalgam. With the present embodiment, a member wherein a stainless substrate with the width of 7 mm, the height of 2 mm, and the thickness of 40 μm, has been plated with gold (Au) of approximately 3 mg, is employed for the auxiliary amalgam 27.

With the fine tube 30a sealed in the intermediate bent tube 21a, the tip end portion 32a of the fine tube 30a extends from the end portion of the bent tube 21a so as to be positioned on the side of the cap 42 within the cover member 40. The fine tube 30a protruding from the end portion of the bent tube 21a is preferably formed with the length L of 25 to 50 mm from the end portion of the bent tube 21a. With the present embodiment, the protrusion is formed with the length of approximately 45 mm therefrom in a straight line.

Furthermore, the fine tube 30a is bent at two portions at the middle portion thereof. The fine tube 30a is bent so as to be close to the axis 1 passing through the center C1 of the cap 42 at one portion, and is also bent so as to be generally parallel to the aforementioned axis 1, again, at the other portion, and accordingly, a bent portion 32b is formed. The fine tube 30a is disposed so that the portion 32c on the tip side as to the bent portion 32b is close to the aforementioned axis 1 as compared with the portion 32d on the base side of the emission bulb 20 as to the bent portion 32b.

That is to say, the bent portion 32b is formed so that the portion 32c on the tip side is extended to the side of the cap 42 so as to be close to the aforementioned axis 1 without contact of the fine tube 30 with the inner wall face of the cover member 40. The fine tube 30a is formed with the length L2 of approximately 40 mm from the end of the bent tube 21 up to the tip end portion 32a of the fine tube 30a.

A principal amalgam 31 comprises an alloy base formed of bismuth (Bi) in the range between 50 and 65% by mass, and tin (Sn) in the range between 35 and 50% by mass containing mercury in the range between 12 and 25% by mass.

With the embodiment, the emission bulb 20 is formed with the height H2 of the bulb in the range between 50 and 60 mm, the discharge path length in the range between 200 and 350 mm, and the maximal width D3 in the range between 32 and 43 mm in the bulb-disposition direction. The emission bulb 20 is filled with an argon gas of 99% or more with charged pressure of 400 to 800 Pa.

Description will now be made taking the side of the cap 42 as the upper side, and the side of the globe 60 as the lower side.

The cover main unit 41 is formed of thermally stable plastic such as polybutylene terephthalate (PBT) or the like, and is formed generally in the shape of a cylinder of which one end is expanded as to the other end, as shown in FIG. 1. The cap 42 is mounted on the one end of the cover main unit 41, and is fixed with adhesion, caulking, or the like. On the other hand, the holder 43 is mounted on the other end of the cover main unit 41, serving as a fixing member for the emission bulb 20 and the lighting device 50. The holder 43 has emission bulb-insertion portions 44 for inserting the ends of the emission bulb 20 as shown in FIG. 3. The emission bulb 20 is attached to the holder 43, and the holder 43 is mounted to the cover main unit 41 so as to cover the opening of the cover main unit 41. Furthermore, a circuit board for the lighting device 50 is mounted to the holder 43 with fitting means (not shown).

Figure 4:
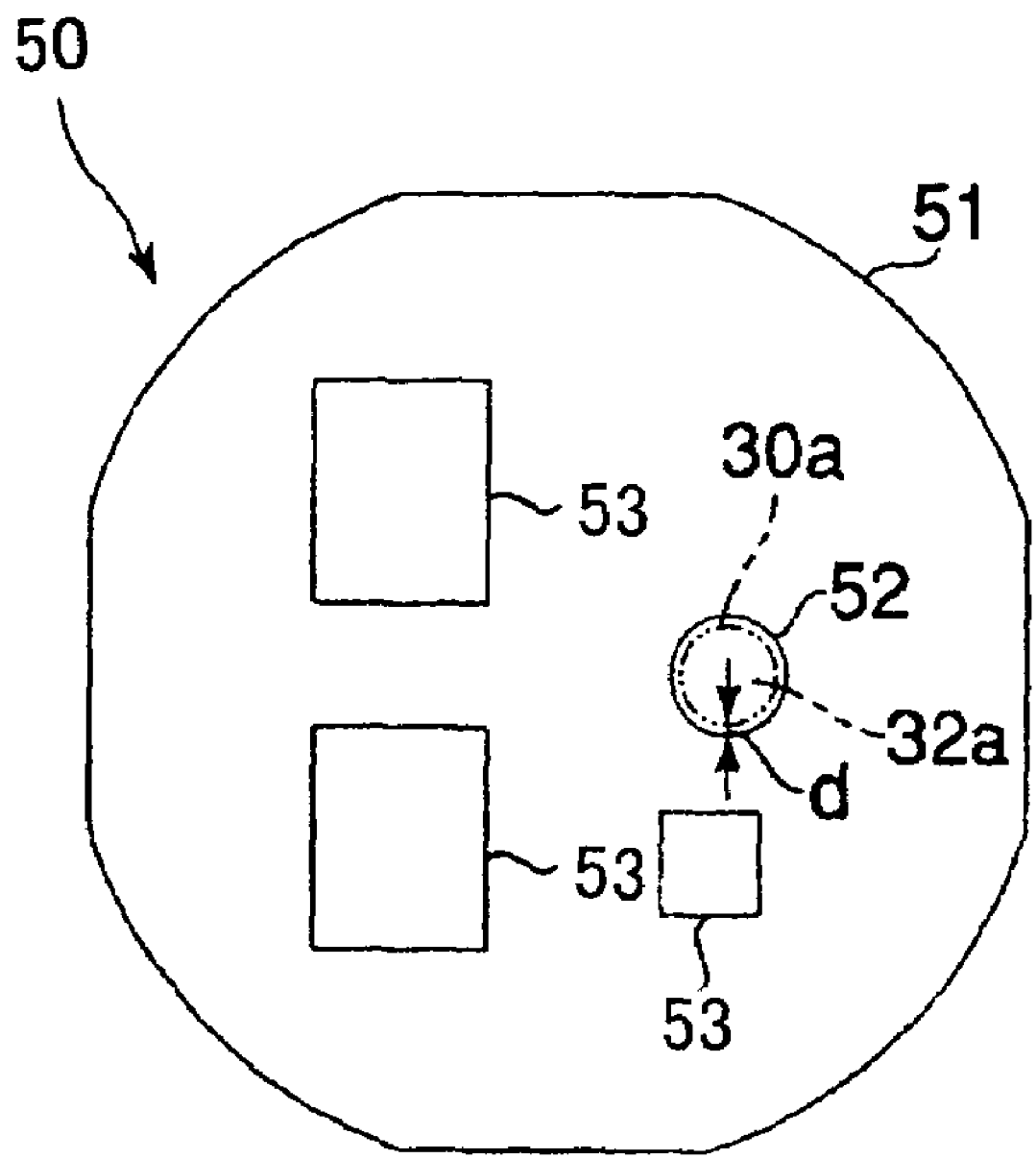
FIG. 4 is a front view which illustrates a circuit board of a lighting device which the fluorescent lamp includes shown in FIG. 1.

The lighting device 50 comprises a circuit board 51 disposed generally orthogonal to the axis 1 passing through the center C1 of the cap 42, and multiple electronic parts 53 mounted on the circuit board 51 as shown in FIGS. 1 and 4, and makes up an inverter circuit (high frequency lighting circuit) for performing high frequency operation. The lighting device 50 is encased within the cover member 40 by mounting the circuit board 51 so that a greater part of the electronic parts are disposed on the side of the cap 42. The lighting device 50 is electrically connected to the cap 42 and the bulb-shaped fluorescent lamp 10. Electric power is supplied to the lighting device 50 through the cap 42 so that the lighting device 50 outputs high-frequency electric power, and the output is applied to the fluorescent lamp 10 for turning on.

The circuit board 51 is formed generally in the shape of a disk, with the diameter (the maximal width size) equal to or less than 1.2 times as to the maximal width of the emission bulb 20. Mounted on one side of the circuit board 51 on the side of the cap 42 are a greater part of electronic parts 53 including an electrolytic capacitor 53a for smoothing, inductors, transformers, resistors, film capacitors, and the like. The electrolytic capacitor 53a is erected generally at the center of the circuit board 51, and is electrically connected to other electronic parts 53 through a pair of leads 55. Note that an arrangement may be made wherein the electrolytic capacitor 53a is erected offset from the center of the circuit board 51 away from an inserting opening 52b as shown in fourth and fifth embodiments described later.

Furthermore, a fine tube inserting opening 52 is formed on the circuit board 51 in the shape of a circle for inserting a fine tube as shown in FIG. 4. The fine tube inserting opening 52 is formed with a size which enables the tip end portion 32a of the fine tube 30a to be inserted. In this case, in order to prevent reduction of the thermal insulating effect of the circuit board 51 as possible, the fine tube inserting opening 52 is preferably formed with the gap between the fine tube inserting opening 52 and the fine tube 30a being equal to or less than 1 mm.

The fine tube inserting opening 52 is preferably formed at a position so that the line m passing through the end of the base end portion 32d and the end of the tip end portion 32c of the bent portion 32b is parallel or orthogonal to the line n passing through circuit board connectors 55a of a pair of leads 55 for electrically connecting the electrolytic capacitor 53a with other electronic parts 53, after manufacturing, as shown in a second embodiment through a fifth embodiment described later.

On the other hand, small-sized electronic devices such as field effect transistors (FETs), rectifier diode (RECs), chip resistors, and the like, are mounted on the other face of the circuit board 51 on the side of the emission bulb 20. Such electronic devices have a relatively high heat resisting temperature.

The tip portion of the electrolytic capacitor 53a for smoothing further protrudes on the side of the cap 42 as compared with the electronic parts 53, which output relatively great heat emission, such as a current-limiting inductor, transformer, resistor, resonant capacitor, and the like. The principal amalgam 31 is disposed on the side of the cap 42 as compared with the electronic parts 53 other than the electrolytic capacitor 53a, and is contained within the tip end portion 32c of the fine tube 30a so as to be positioned adjacent to the electrolytic capacitor 53a. At this time, the principal amalgam 31 is positioned distanced from the face of the circuit board 51 on the side of the cap 42 by the distance L3 of approximately 35 mm.

The globe 60 is formed of a transparent material or an opalescent material having light diffusability, wherein both materials have transmittance. The glove 60 is formed of glass or plastic in a shape of a smooth curve face generally the same as the glass globe of a normal illuminating bulb. The globe 60 contains the emission bulbs 20, and also the opening is fit to the other end side of the cover member 40 so as to be mounted thereto. Note that an arrangement may be made wherein the globe 60 is formed of a combination with other members such as a diffusion film or the like so as to improve the uniformity of luminance.

The lighting device 50 is configured so that lighting is performed with the current density (current per unit cross-section) in the range between 3 and 5 mA/mm$^2$ within the emission bulb 20 from the lamp electric power in the range between 7 and 15 W. The bulb-shaped fluorescent lamp 10 of the present embodiment is formed with the input electric power standard of 12 W, wherein high-frequency power of 10.5 W is applied to the emission bulb 20, lamp current is 190 mA, lamp voltage is 58 V, and the entire light flux output from the emission bulb 20 is approximately 810 lm.

With the bulb-shaped fluorescent lamp 10, the bent portion 32b of the fine tube 30a is disposed on the side of the emission bulb 20 as compared with the circuit board 51, and also the tip end portion 32c is inserted into the fine tube inserting portion 52 so as to extend on the side of the cap 42, as shown in FIG. 1. That is to say, with the bulb-shaped fluorescent lamp 10, the tip end portion 32c of the fine tube 30a is relatively moved in the direction parallel to the axis 1 passing through the center C1 of the cap 42 (direction parallel to the longitudinal direction of the emission bulb 20) so as to be inserted into the fine tube inserting opening 52 of the circuit board 51.

Furthermore, in order to facilitate assembling, the bent portion 32b is preferably bent so that the end portion of the emission bulb 20 is relatively moved in the direction parallel to the aforementioned axis 1, and is inserted into the emission bulb inserting portion 44 of the holder 43.

In the event that the bent portion 32b is bent for avoiding the electric parts 53, setting the position of the principal amalgam 31 (position of the tip end portion 32a of the fine tube 30a) to a desired position, or the like, and causes interference with the emission bulb inserting portion 44 when the bent portion 32b is inserted into the emission bulb inserting portion 44 as shown in FIG. 3, assembling may be made with the following procedures. First of all, the end portion of the emission bulb 20 is inserted into the emission bulb inserting portion 44 in a direction oblique as to the aforementioned axis 1, following which the end portion of the emission bulb 20 is adjusted so as to be positioned in the direction parallel to the aforementioned axis 1.

With the bulb-shaped fluorescent lamp 10 employing the principal amalgam 31 which effects relatively high mercury vapor pressure as in the present embodiment, it has been found that a part of the mercury is not absorbed by the principal amalgam 31, and is deposited within the fine tube 30a as metal mercury. Accordingly, in a case of employing a straight tube for the fine tube 30a, in the event that the tip end portion 32a of the fine tube 30a is turned on the upper side, the deposited metal mercury might move and enter the inside of the emission bulb 20 due to its own weight. The deposited metal mercury which has entered the inside of the emission bulb 20 causes unstable mercury vapor pressure within the emission bulb 20, leading to a disadvantage of unstable light quantity.

Accordingly, in order to prevent the deposited metal mercury within the fine tube 30a from entering the inside of the emission bulb 20, the bent portion 32b is preferably formed with the angle value θ (see FIG. 5A) in the range between 10° and 90° as to the longitudinal direction of the fine tube 30a. The optimal angle value is 90°. Thus, the metal mercury is prevented from entering the inside of the emission bulb 20.

Furthermore, the sealed principal amalgam 31 can be also moved within the fine tube 30a. Accordingly, in a case of employing a straight tube for the fine tube 30a, in the event that the tip end portion 32a of the fine tube 30a is turned on the upper side, the principal amalgam 31 might move and enter the inside of the emission bulb 20 due to its own weight. The principal amalgam 31 which has entered the inside of the emission bulb 20 causes unstable mercury vapor pressure within the emission bulb 20, leading to disadvantage of unstable light quantity in the same way as with a case that the deposited metal mercury enters the inside of the emission bulb 20.

With the present embodiment, the fine tube 30a has the bent portion 32b formed at the middle portion thereof, and accordingly, the principal amalgam 31 contained within the tip end portion 32c hardly enters inside the emission bulb 20. Furthermore, the entrance of the bent portion 32b on the side of the cap 42 is preferably narrowed (see FIG. 5A) so that the principal amalgam 31 cannot pass through using the fact that the inner diameter of the glass tube is reduced due to the glass collecting on the inside of the bent portion 32b when heating and bending the glass tube. Such a configuration enables prevention of the principal amalgam 31 from entering the inside of the emission bulb 20 in a more sure manner.

Note that, with the configuration as shown in FIG. 5A, while the principal amalgam 31 can move up to the entrance of the bent portion 32b on the side of the cap 42, the principal amalgam 31 is preferably positioned at a position at a low temperature, i.e., is preferably positioned at the tip end portion 32a as possible.

In order to hold the principal amalgam 31 at the tip end side portion 32a of the fine tube 30a as much as possible, a recessed portion 33 recessed on the inside is preferably formed at the tip end portion 32c of the fine tube 30a as shown in FIG. 5B or FIG. 5C so that the principal amalgam 31 cannot move on the side of the emission bulb 20. Such a configuration enables the principal amalgam 31 to be held at the tip end portion 32a of the fine tube 30a with a simple configuration. Note that while an arrangement having one recessed portion 33 is shown in FIG. 5B, an arrangement may be made wherein multiple recessed portions are formed (e.g., two recessed portions in FIG. 5C).

Also, as shown in FIG. 5D, an arrangement may be made wherein a tube member 34 with the outer diameter less than the inner diameter of the fine tube 30a is sealed into the fine tube 30a so as to be disposed at the tip end portion 32c, so that the principal amalgam 31 is held by the tube member 34, and cannot move on the side of the emission bulb 20. Furthermore, as shown in FIG. 5E, a recessed portion 33 recessed inside is formed on the tip end portion 32c, and the tube member 34 is sealed within the fine tube 30a on the side of the cap 42 as to the recessed portion 33. Such a configuration enables the principal amalgam 31 to be held by the tube member 34 so that the tube member 34 cannot move on the side of the emission bulb 20, and also enables the tube member 34 to be held by the recessed portion 33 so that the tube member 34 cannot be move on the side of the emission bulb 20, and thus the tube member 34 is formed with the length less than that shown in FIG. 5D, thereby enabling the costs for the tube member 34 to be reduced. As described above, as shown in FIGS. 5B through 5E, the fine tube 30a having such a configuration enables the principal amalgam 31 to be held at the tip end portion 32a with a relatively low temperature, i.e., on the side of the cap 42.

On the other hand, the temperature of the principal amalgam 31 is preferably high immediately following turning on for improving light quantity rising properties. For that purpose, reduction of temperature of the principal amalgam 31 over time following turning off is preferably prevented as possible. In order to suppress reduction of the temperature of the principal amalgam 31 following turning off, a material having great heat capacity, a material which is converted into liquid when the lamp is on, and is converted into a solid when the lamp is off, or a material which is converted into gas when the lamp is on, and is converted into liquid when the lamp is off, is preferably disposed near the principal amalgam 31.

That is to say, a material having great heat capacity enables reduction of the temperature of the principal amalgam 31 over time to be suppressed due to the material serving as a thermal buffer. On the other hand, with the material which is converted into liquid when the lamp turns on, and is converted into a solid when the lamp turns off, or the material which is converted into gas when the lamp turns on, and is converted into liquid when the lamp turns off, the material is converted into a solid or liquid while generating thermal energy following turning off, and accordingly, reduction of the temperature of the principal amalgam 31 over time is suppressed due to the output thermal energy.

Figure 6A:
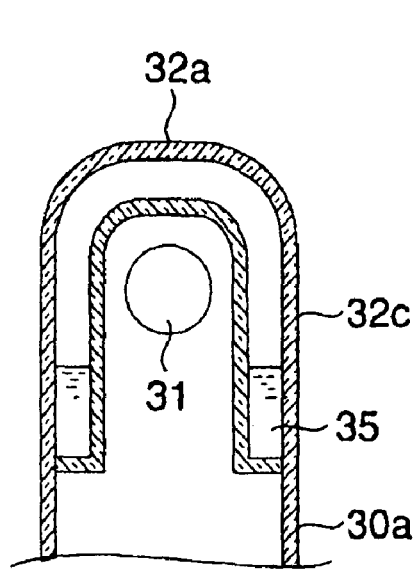
FIGS. 6A and 6B are cross-sectional diagrams which illustrate a configuration of another fine tube which the fluorescent lamp includes shown in FIG. 1.
Figure 6B:
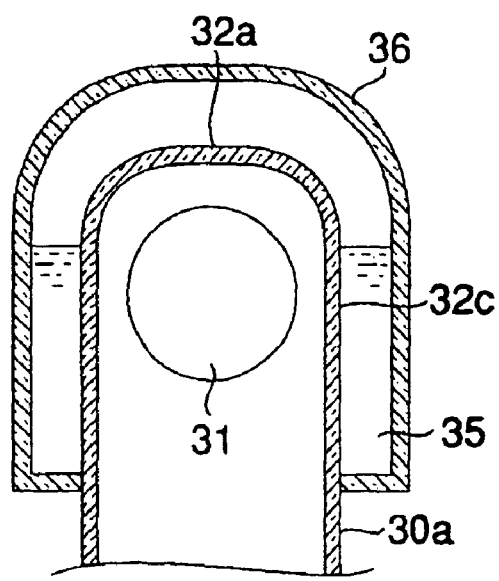

For that purpose, as shown in FIG. 6A, a low melting point material 35 such as polyethylene glycol (melting point of 70° C.) or the like is sealed in liquid into the tip end portion 32c of the fine tube 30a. Also, an arrangement may be made wherein a low melting point material 35 is sealed into a hallow cap 36 formed of glass, and the opening of the hallow cap 36 is welded to the tip end portion 32c of the fine tube 30a, as shown in FIG. 6B.

When the lamp is on, the low melting point material is converted into liquid due to heat emitted from the emission bulb 20. When the lamp is off, and the temperature of the tip end portion 32c of the fine tube 30a becomes low, the polyethylene glycol 35 is converted into a solid while emitting thermal energy. Reduction of the temperature of the principal amalgam 31 over time is suppressed due to the emitted thermal energy, and accordingly, the light quantity rising properties in a case of turning on again is improved.

Figure 7:
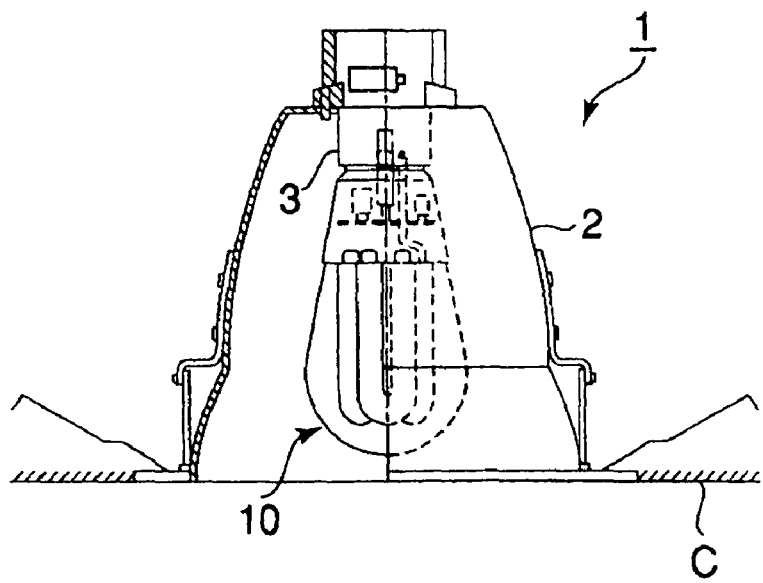
FIG. 7 is a cross-sectional diagram which illustrates an illumination device according to the first embodiment of the present invention including the fluorescent lamp shown in FIG. 1.

The bulb-shaped fluorescent lamp 10 can be employed for an illumination device shown in FIG. 7, for example. A illumination device 1 is a downlight embedded in a ceiling C, wherein the bulb-shaped fluorescent lamp 10 is mounted to a socket 3 mounted to a device main unit 2.

The bulb-shaped fluorescent lamp 10 exhibits light distribution similar to that of a normal illuminating bulb, and accordingly, in a case of substituting the bulb-shaped fluorescent lamp 10 for a normal illuminating bulb used for the illumination device 1 as described above, lighting is performed with sufficient luminance toward a reflector disposed within the device main unit 2 near the socket 3, and thus the illumination device 1 exhibits device properties exactly according to the optical design for the reflector. Furthermore, even in a case of employing the bulb-shaped fluorescent lamp 10 for an illumination device such as a desk lamp, wherein the image of an internal light source is projected on a light-diffusion cover formed of cloth or the like, the bulb-shaped fluorescent lamp 10 exhibits light distribution similar to that of a normal illuminating bulb, and accordingly, the bulb-shaped fluorescent lamp 10 is employed in the illumination device without as if it were a normal illuminating bulb.

Note that the bulb-shaped fluorescent lamp 10 can be employed in the device main unit 2 having the socket 3 which can be detachably connected to the cap 42 of the bulb-shaped fluorescent lamp 10 regardless of whether the device main unit has been formed for the bulb-shaped fluorescent lamp, or has been formed for a conventional illuminating bulb. Also, various kinds of device main units 2 such as a surface-mounting device or the like, not to mention a downlight, may be employed for the illumination device 1.

Figure 8:
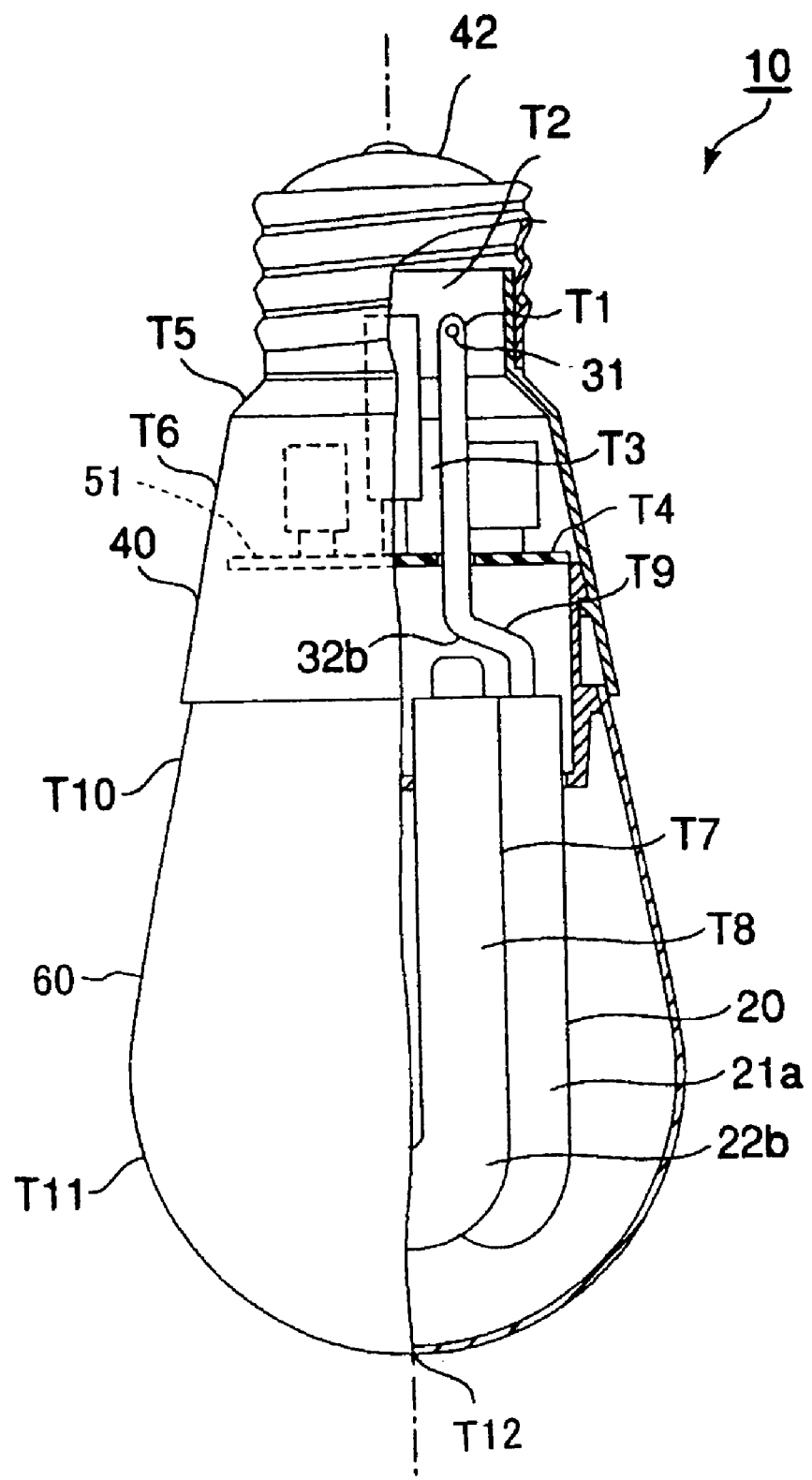

Next, description will be made regarding operations of the present embodiment. The temperature distribution when the lamp turns on is shown in FIG. 8. With the temperature measurement conditions, the bulb-shaped fluorescent lamp 10 was turned on with the cap 42 facing the upper side, in a windless atmosphere at a temperature of 25° C. At this time, regarding power consumption of the bulb-shaped fluorescent lamp 10, approximately 10% of the input electric power of 12.1 W was used for the lighting circuit.

Description will be made below regarding the temperature distribution with regard to the fluorescent lamp when the lamp is turned on. The temperature T1 of the fine tube 30a near the principal amalgam 31 was 55° C., the temperature T2 of the inner side space of the cap 42 was 53° C., the temperature T3 of the space in the middle portion of the cover member 40 (the temperature of the space where the upper ends of the heat-emitting parts are positioned) was 62° C., the temperature T4 of the upper face of the circuit board 51 was 98° C., the temperature T5 of the upper portion of the outer face of the cover member 40 was 62° C., the temperature T6 of the middle portion was 62° C., the temperature T7 near the electrode 24 of the emission bulb 20 was 158° C., the positive column temperature T8 was 136° C., the temperature T9 of the bent portion 32b was 106° C., the temperature T10 of the upper portion of the outer face of the globe 60 was 81° C., the temperature T11 of the maximal outer diameter portion was 60° C., and the temperature T12 of the apex portion was 57° C.

As described above, the portions near the lighting device 50 exhibit high temperature due to the portions being positioned on the upper portion of the emission bulb 20 which is a principal heat-emitting component. That is to say, the emitted heat diffuses in the upper direction and the outer-diameter direction, and principal heat-emitting parts such as a ballast coil, transistor, and the like, of the lighting device 50, form a high-temperature space near the parts. The space within the cover member 40 on the side of the cap 42 away from such heat-emitting parts exhibits relatively low temperature as compared with a group of the heat-emitting parts. The principal amalgam 31 is disposed in the space with relatively low temperature, so the principal amalgam 31 exhibits a low temperature. Note that the electrolytic capacitor near the principal amalgam 31 emits little heat, and the temperature of the inside near the cap 42 is in the range between 50 and 60° C.

On the other hand, with a conventional example (short-fine-tube type) including the emission bulb 20 having a fine tube with the protruding length of approximately 10 mm, where the principal amalgam 31 has been sealed, the principal amalgam 31 exhibited the temperature of approximately 90° C. in measurement. With the long-fine-tube type arrangement wherein the principal amalgam 31 is disposed on the side of the cap 42 as shown in the present embodiment, reduction of the temperature of the principal amalgam 31 by 30° C. to 40° C. is effected.

Next, description will be made below regarding the measurement for evaluation with regard to the light quantity rising properties of the present embodiment, conventional example, and comparative example. As the conventional example, an arrangement including the emission bulb 20 having a fine tube with protrusion length of approximately 10 mm in which the bismuth-indium (Bi—In) principal amalgam 31 (short-fine-tube type) was employed. Also, as a comparative example 1, an arrangement wherein an amalgam formed of indium had been substituted for the auxiliary amalgam 27 of the bulb-shaped fluorescent lamp according to the present embodiment (long-fine-tube type) was employed. Furthermore, as a comparative example 2, an arrangement wherein the auxiliary amalgam 27 of the bulb-shaped fluorescent lamp according to the present embodiment (long-fine-tube type) had been removed, was employed. Measurement was made with regard to the light quantity rising properties for each arrangement. The measurement was performed with lighting being performed using a commercially-available 100-V AC power source, and with the cap 42 facing the upper side in a windless atmosphere at a temperature of 25° C. At this time, the input current and the consumption power were 194 mA and 12.1 W, respectively, for each arrangement.

Figure 9:
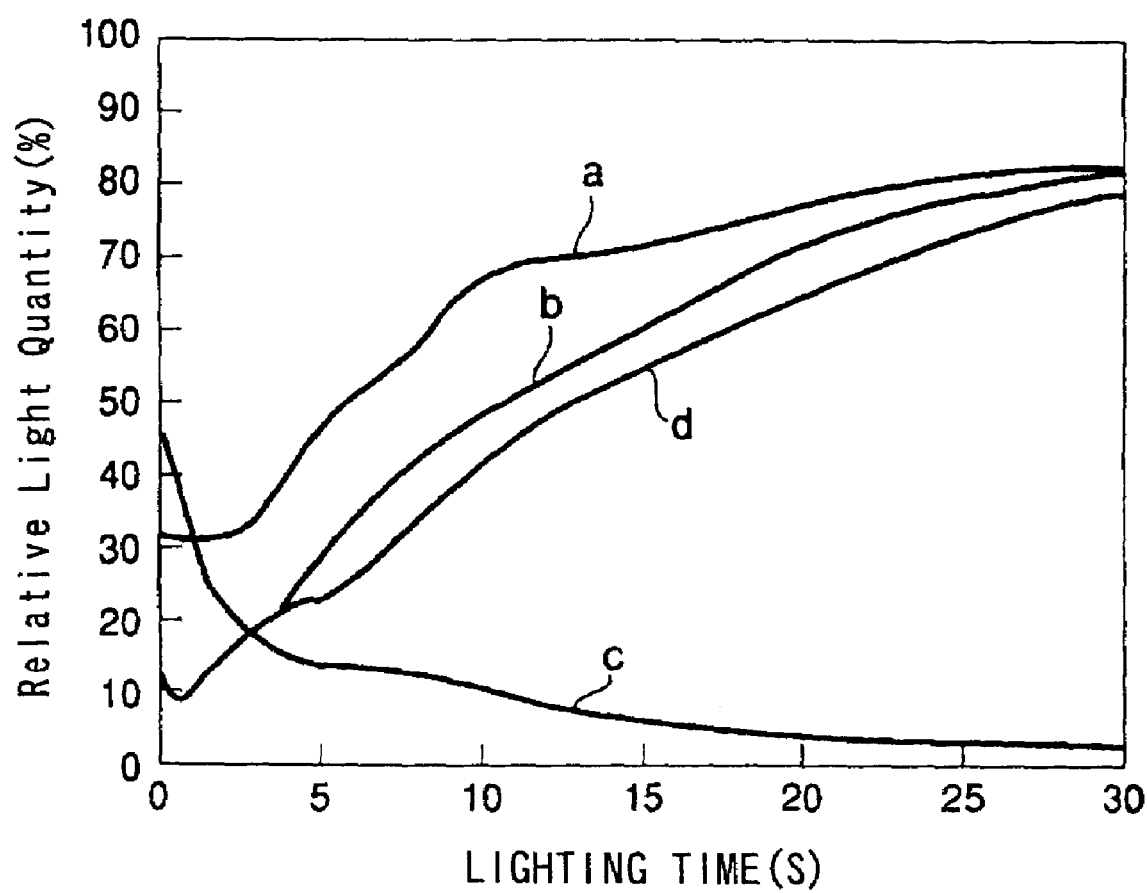

FIG. 9 shows the measurement results, wherein the changes in the light quantities over time from the start of lighting. In FIG. 9, line "a" represents the change in the light quantity of the present embodiment, line "b" represents the change in the light quantity of the comparative example 1, line "c" represents the change in the light quantity of the comparative example 2, and line "d" represents the change in the light quantity of the conventional example. The light quantities immediately following turning on are represented with the following relation.

Comparative Example 2>Present Embodiment>Comparative Example 1>Conventional Example However, the light quantities after three to four seconds following turning on are represented with the following relation.

Present Embodiment>Comparative Example 1>Conventional Example>Comparative Example 2

Subsequently, with the comparative example 2, dim lighting was observed for several minutes.

With the comparative example 1, it has been found that the light quantity rising property is improved as compared with the conventional example due to speedy increase of the mercury vapor pressure, but the light quantity immediately following turning on is generally the same as the conventional example.

On the other hand, with the bulb-shaped fluorescent lamp 10 according to the present embodiment, it has been confirmed that a proper quantity of mercury is emitted from the auxiliary amalgam 27 immediately following turning on, and accordingly, lack of mercury is not caused, and thus the bulb-shaped fluorescent lamp 10 has excellent light quantity rising properties wherein approximately 50% of the light quantity when in stable lighting is obtained at the point after five seconds have elapsed following turning on, and approximately 85% of the light quantity when in stable lighting is obtained at the point after 25 seconds have elapsed following turning on.

As described above, with the present embodiment, the principal amalgam 31 is disposed in a space within the cover member 40 on the side of the cap 42 with a relatively low temperature, and accordingly, the principal amalgam 31 having the property of causing high mercury vapor pressure can be employed, thereby improving the light quantity rising properties with a simple configuration.

Furthermore, with the present embodiment, the portion of the fine tube between the bent portion 32b and the tip end portion 32c is positioned closed to the axis 1 passing through the center C1 of the cap 42 as to the portion thereof between the bent portion 32b and the base portion 32d, i.e., the tip end portion 32c of the fine tube 30a is disposed at a position close to the axis 1, and thus, the principal amalgam 31 can be disposed at a position close to the cap 42 without employing a large-sized bulb-shaped fluorescent lamp.

Furthermore, the bent portion 32b of the fine tube 30a is disposed at a position close to the emission bulb 20 as to the circuit board 51, and also the tip end portion 32c of the fine tube 30a is inserted into the fine tube inserting portion 52 so as to be extended on the side of the cap 42, and accordingly, the fine tube inserting opening 52 can be formed with the minimal size for inserting the tip end portion 32c, and thus reduction of thermal insulation effect due to the circuit board 51 can be suppressed.

Furthermore, the bent portion 32b is disposed at a position close to the emission bulb 20 as to the circuit board 51, and accordingly, the tip end portion 32c of the fine tube 30a can be relatively moved in the direction parallel to the axis 1 passing through the center C1 of the cap 42 so as to be inserted into the fine tube inserting opening 52 of the circuit board 51, and be extended on the side of the cap 42. Accordingly, although the bent portion 32b is formed at the middle portion of the fine tube 30a, there is no need to insert the tip end portion 32c of the fine tube 30a into the fine tube inserting opening 52 from the direction oblique as to the aforementioned axis 1 when assembling, and thus assembling can be facilitated.

Next, description will be made regarding a second embodiment of the present invention with reference to FIGS. 10 through 13.

Figure 10:
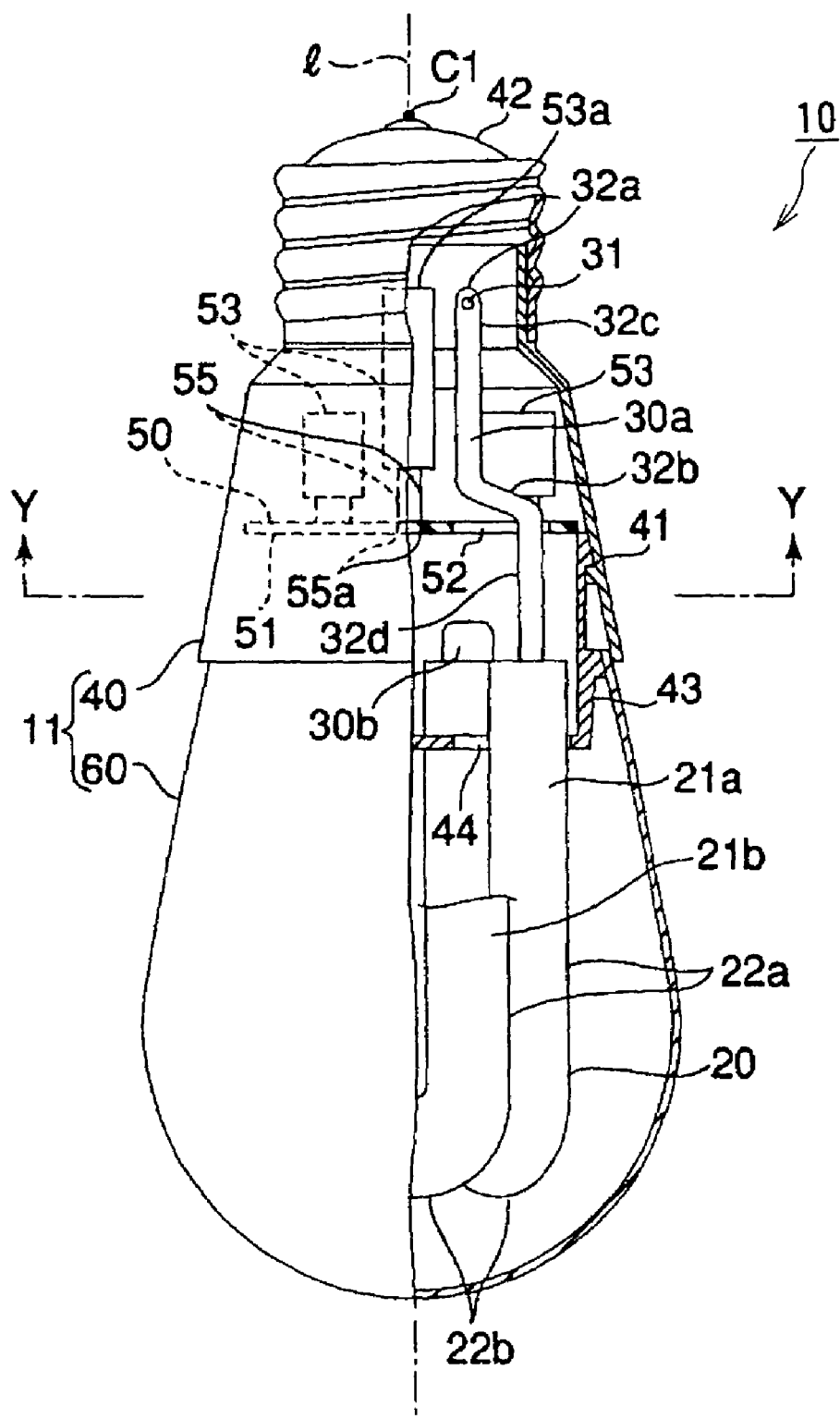
FIG. 10 is a partial cross-sectional diagram which illustrates a fluorescent lamp according to a second embodiment of the present invention.
Figure 11:
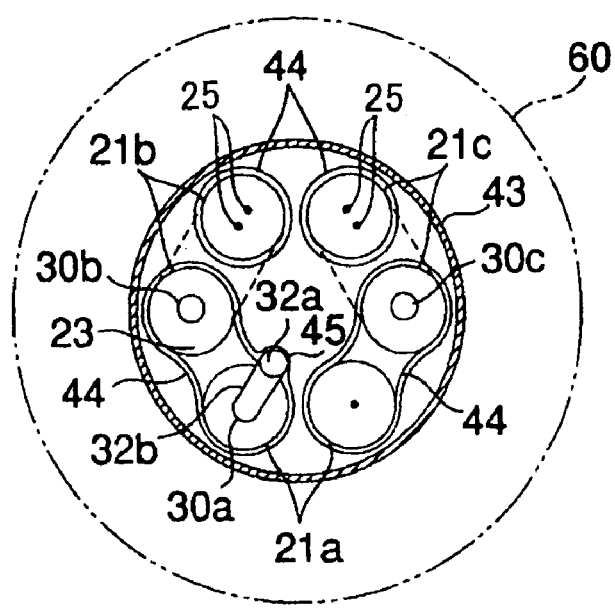
FIG. 11 is a cross-sectional view taken along line Y-Y of FIG. 10.
Figure 12:
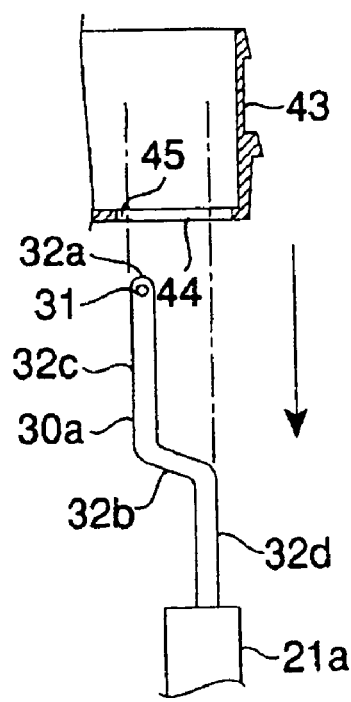
FIG. 12 is a cross-sectional diagram which illustrates the relation between a fine tube and an inserting opening of a holder, which the fluorescent lamp shown in FIG. 10 comprises.

As shown in FIG. 10, the bulb-shaped fluorescent lamp 10 according to the present embodiment has a configuration wherein the end portion of the emission bulb 20 is inserted into the emission bulb inserting portion 44 of the holder 43 in the direction parallel to the axis 1 passing through the center C1 of the cap 42 with the bent portion 32b of the fine tube 30a protruding from the emission bulb inserting portion 44. Accordingly, as shown in FIG. 11, a notched portion 45 is formed on the emission bulb inserting portion 44. The notched portion is formed so that the bent portion 32b of the fine tube 30a is not in contact with the holder 43 when the end portion of the emission bulb 20 is relatively moved in the direction parallel to the aforementioned axis 1 so as to be inserted into the inserting portion 44. Accordingly, as shown in FIG. 12, when the end portion of the emission bulb 20 is inserted into the emission bulb inserting portion 44, the bent portion 32b is inserted into the notched portion 45.

Furthermore, with the present embodiment, the bent portion 32b of the fine tube 30a is disposed at a position close to the cap 42 as to the circuit board 51. Accordingly, the fine tube inserting portion 52 of the circuit board 51 should be formed in the shape of an ellipse so that both the tip end portion 32c and the bent portion 32b of the fine tube 30a can be inserted when the tip end portion 32c of the fine tube 30a is relatively moved in the direction parallel to the aforementioned axis 1. With the present embodiment, the fine tube inserting portion 52 is formed as a notched portion 52a in the shape of an ellipse. Note that an arrangement may be made the inserting portion 52 is formed as an opening.

Figure 13:
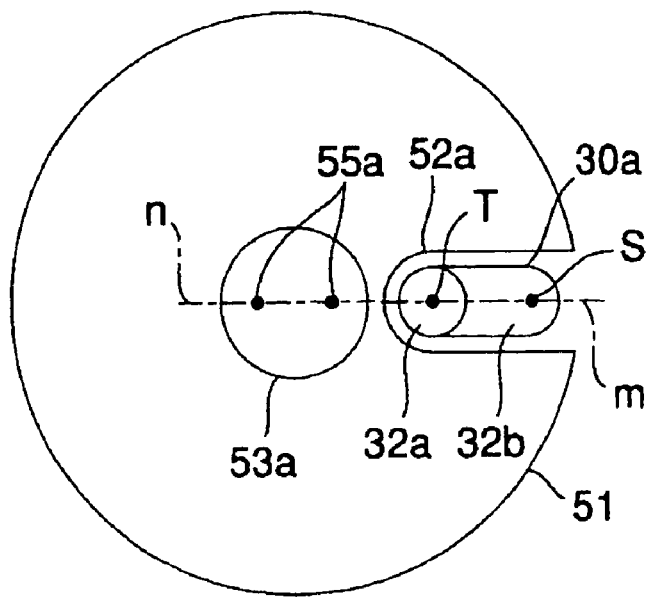
FIG. 13 is a plan view for describing the positional relation between an electrolytic capacitor mounted on the circuit board and the bent portion of the fine tube, which the fluorescent lamp shown in FIG. 10 includes.

Furthermore, with the present embodiment, as shown in FIG. 13, the position of the notched portion 52a of the circuit board 51 is determined so that the line m passing through the base end portion 32d of the bent portion 32b and the tip end portion 32c, and the line n passing through the board connectors 55a of a pair of the leads 55 for electrically connecting the electrolytic capacitor 53a and other electronic parts 53, are parallel one to another, and form a single line. Furthermore, the positional relation between the circuit board 51 and the holder 43 is determined so that the notched portion 52a of the circuit board 51 is positioned above the notched portion 45 (see FIG. 12) provided on the emission bulb inserting portion 44. Other components are the same as with the above-described first embodiment, so the same components are denoted with the same reference characters in FIGS. 10 through 13, and description thereof will be omitted.

With the present embodiment, the principal amalgam 31 is disposed in a space within the cover member 40 close to the cap 42 with a low temperature in the same way as with the first embodiment, and accordingly, the principal amalgam having the nature of causing high mercury vapor pressure can be employed, thereby improving the light quantity rising properties with a simple configuration.

Furthermore, with the present embodiment, the bent portion 32b is inserted into the notched portion 45 when the end portion of the emission bulb 20 is inserted into the emission inserting portion 44, and thus, the end portion of the emission bulb 20 can be relatively moved in the direction parallel to the axis 1 passing through the center C1 of the cap 42 so as to be inserted into the emission bulb inserting portion 44, as shown in FIG. 12. That is to say, there is no need to insert the end portion of the emission bulb 20 into the emission bulb inserting portion 44 from the direction oblique as to the aforementioned axis 1, thereby facilitating assembling.

Thus, with the present embodiment, assembling can be easily performed without trouble even in the event that the bent portion 32b protrudes from the emission bulb inserting portion 44 for avoiding the electronic parts 53, for determining the position of the principal amalgam 31, i.e., the position of the tip end portion 32a of the fine tube 30a, or the like.

Furthermore, with the present embodiment, the bent portion 32b is inserted into the notched portion 45 of the holder, and is inserted into the notched portion 52a of the circuit board 51 so that the line m passing through the base end portion 32d and the tip end portion 32c of the bent portion 32b, and the line n passing through the board connectors 55a of a pair of the leads 55 for electrically connecting the electrolytic capacitor 53a and other electronic parts 53, are parallel one to another. Accordingly, even in the event that the fine tube 30a is pressed into contact with the electrolytic capacitor 53a when assembling, the leads 55 making up a pair is not readily bent from the force in the direction parallel to the line n, and thus, the electrolytic capacitor 53a is not readily tilted. Thus, the electrolytic capacitor 53a can be prevented from being pressed into contact with the inner wall of the cover member 40, and accordingly, trouble in that the lighting device 50 cannot be contained in the cover member 40 can also be prevented, thereby further facilitating assembling.

Figure 14:
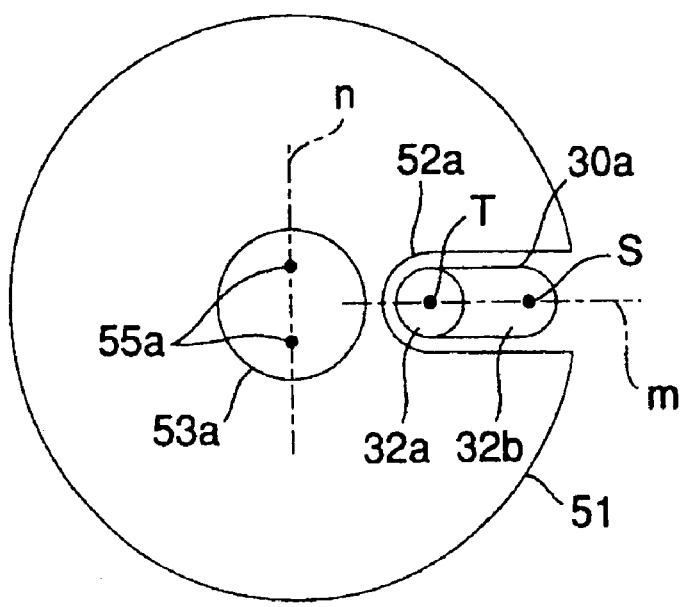
FIG. 14 is a plan view for describing the positional relation between the electrolytic capacitor mounted on the circuit board and the bent portion of the fine tube, which the fluorescent lamp according to a third embodiment of the present invention includes.

Next, description will be made regarding a third embodiment of the present invention with reference to FIG. 14.

With the present embodiment, the position of the notched portion 52a of the circuit board 51 is determined so that the line m passing through the base end portion 32d and the tip end portion 32c of the bent portion 32b is orthogonal to the line n passing through the board connectors 55a of the leads 55 making up a pair for electrically connecting the electrolytic capacitor 53a and other electronic parts 53. Other components are the same as with the second embodiment as described above, so the same components are denoted with the same reference characters in FIG. 14, and description thereof will be omitted.

With the present embodiment, the same advantages can be obtained as with the second embodiment. Furthermore, with the present embodiment, the bent portion 32b is inserted into the notched portion 45 of the holder, and also is inserted into the notched portion 52a of the circuit board 51, so that the line m passing through the base end portion 32d and the tip end portion 32c of the bent portion 32b is orthogonal to the line n passing through the board connectors 55a of the leads 55 making up a pair for electrically connecting the electrolytic capacitor 53a and other electronic parts 53. Accordingly, in the event that the fine tube 30a is pressed into contact with the electrolytic capacitor 53a when assembling, the leads 55 making a pair are easily bent from the force orthogonal to the line n, and accordingly, the electrolytic capacitor 53a is easily bent away from the fine tube 30a. Accordingly, strain is not readily placed on the board connectors 55a of the leads 55, and stress is reduced on the solder or the like for electrically connecting the leads 55 and the wiring on the circuit board 51, thereby suppressing problems of loose electrical connection between the electrolytic capacitor 53a and other electronic parts 53.

Next, description will be made regarding a fourth embodiment of the present invention with reference to FIGS. 15 through 17.

Figure 15:
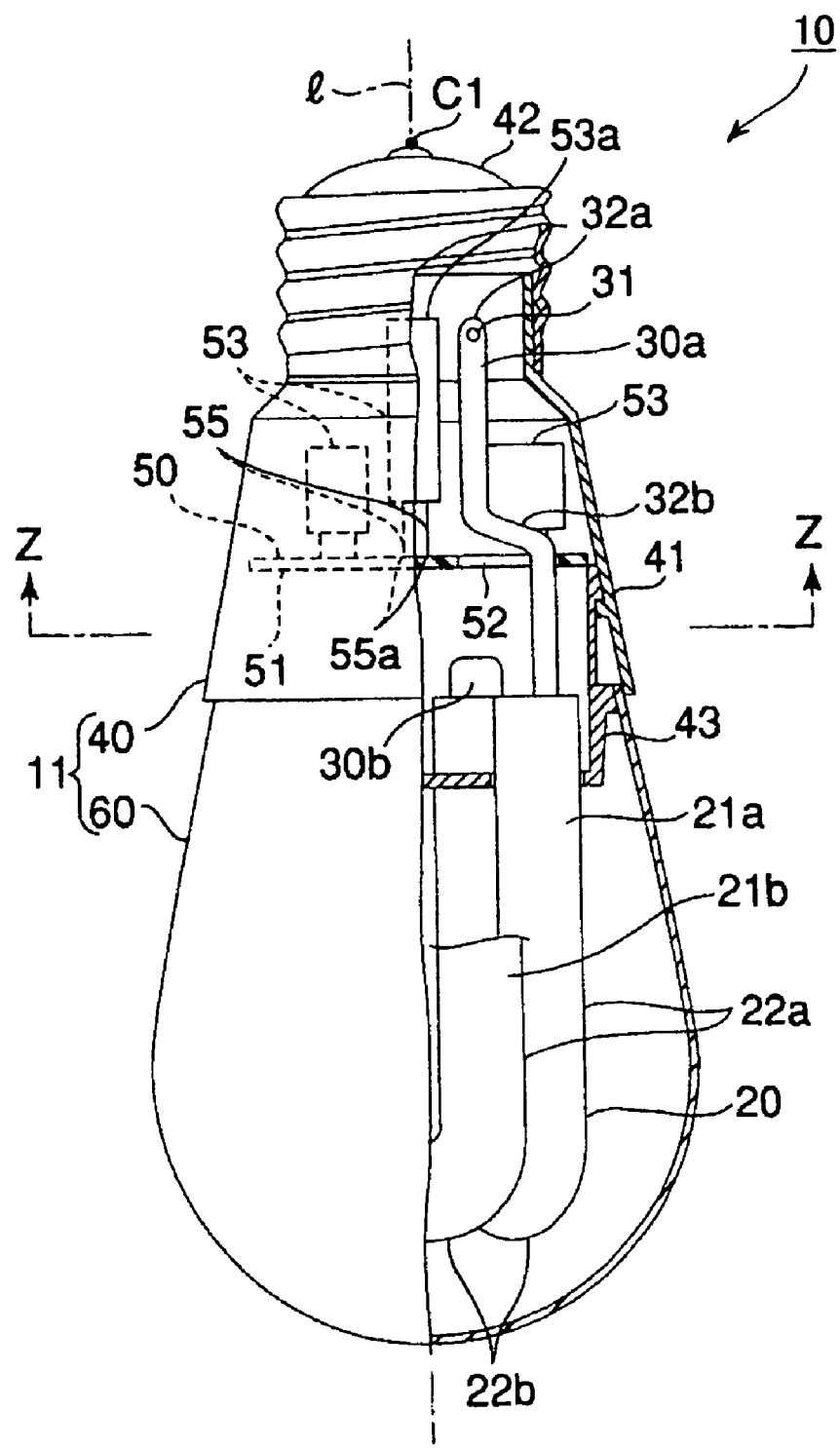
FIG. 15 is a partial cross-sectional diagram which illustrates a bulb-shaped fluorescent lamp according to a fourth embodiment of the present invention.
Figure 16:
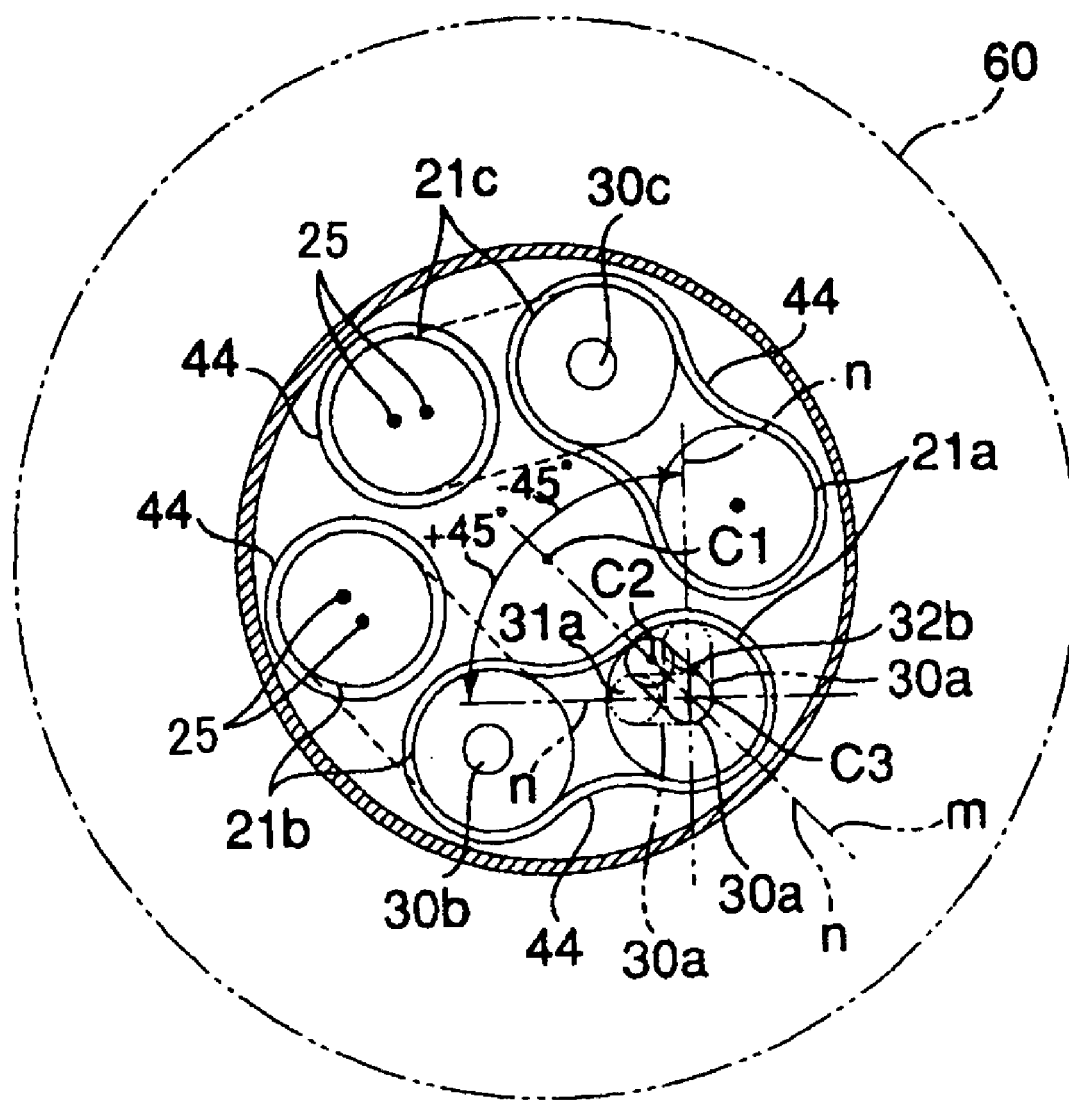
FIG. 16 is a cross-sectional view taken along line Z—Z of FIG. 15.

With the bulb-shaped fluorescent lamp 10 according to the present embodiment, as shown in FIGS. 15 and 16, the position of the emission bulb 20 is determined so that the line passing through the center C2 of the end portion of the emission bulb 20 and the center C3 of the tip end portion 32a of the fine tube 30a, and the line passing through the center C2 of the end portion of the emission bulb 20 and the center C1 of the cap 42, intersect at an angle in the range between −45° and +45°. Furthermore, the position of the emission bulb 20 is optimally determined so that the aforementioned lines intersect at an angle of 0°. Furthermore, the bent portion 32b of the fine tube 30a is formed so that the bent portion 32b can be inserted into the emission bulb inserting portion 44 of the holder 43 when the end portion of the emission bulb 20 is relatively moved in the direction parallel to the axis 1 passing through the center C1 of the cap 42 at the time of assembling.

Furthermore, with the present embodiment, the bent portion 32b of the fine tube 30a is disposed at a position close to the cap 42 as to the circuit board 51. Accordingly, the fine tube inserting portion of the circuit board 51 should be formed in the shape of an ellipse so that both the tip end portion 32c and the bent portion 32b of the fine tube 30a can be inserted when the tip end portion 32c of the fine tube 30a is relatively moved in the direction parallel to the aforementioned axis 1 at the time of assembling. With the present embodiment, the fine tube inserting portion is formed as the inserting opening 52b in the shape of an ellipse. Note that an arrangement may be made wherein the fine tube inserting portion is formed as a notched portion.

Figure 17:
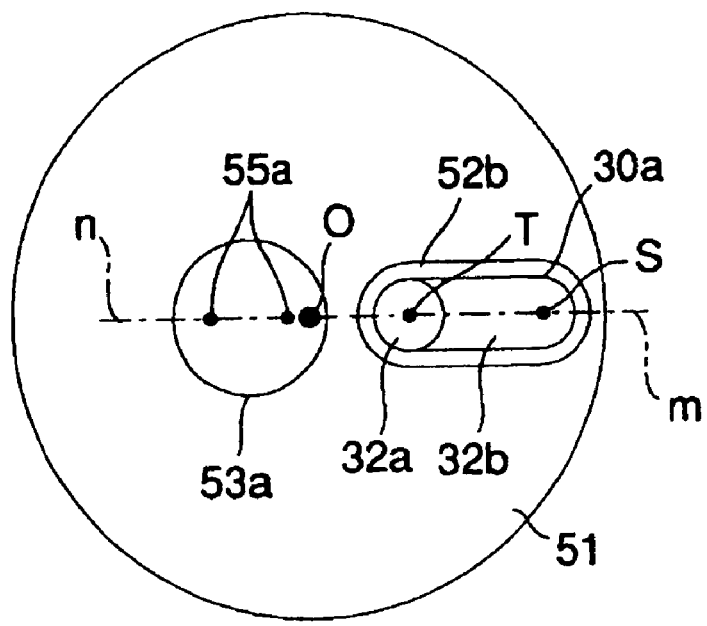
FIG. 17 is a plan view for describing the positional relation between the electrolytic capacitor mounted on the circuit board and the fine tube, which the fluorescent lamp shown in FIG. 15 includes.

Furthermore, with the present embodiment, as shown in FIG. 17, the electrolytic capacitor 53a is erected offset from the center O of the circuit board 51 away from the inserting opening 52b. Furthermore, the position of the inserting opening 52b of the circuit board 51 is determined so that the line m passing through the base end portion 32d of the bent portion 32b and the tip end portion 32c, and the line n passing through the board connectors 55a of the leads 55 making a pair for electrically connecting the electrolytic capacitor 53a and other electronic parts 53, are parallel one to another, and form a single line. Other components are the same as with the first embodiment described above, so the same components are denoted with the same reference characters in FIGS. 15 through 17, and description thereof will be omitted.

With the present embodiment, the principal amalgam 31 is disposed in a space within the cover member 40 close to the cap 42 with a relatively low temperature in the same way as with the first embodiment, and accordingly, an amalgam having the nature of causing high mercury vapor pressure can be employed for the principal amalgam 31, thereby improving the light quantity rising properties with a simple configuration.

Furthermore, with the present embodiment, the bent portion 32b of the fine tube 30a is formed so that the line passing through the center C2 of the end portion of the emission bulb 20 and the center C1 of the cap 42, and the line passing through the center C2 of the end portion of the emission bulb 20 and the center C3 of the tip end portion 32a of the fine tube 30a, intersect at an angle in the range between −45° and +45°, and accordingly, when inserting the end portion of the emission bulb 20 into the emission bulb inserting portion 44, the holder 43 does not interfere with the insertion. Accordingly, the end portion of the emission bulb 20 can be relatively moved in the direction parallel to the axis 1 passing through the center C1 of the cap 42 so as to be inserted into the emission bulb inserting portion 44. That is to say, there is no need to insert the end portion of the emission bulb 20 into the emission bulb inserting portion 44 from the direction oblique as to the aforementioned axis 1, thereby facilitating assembling. Furthermore, there is no need to design the emission bulb inserting portion 44 with a size greater than the size necessary for the end portion of the emission bulb 20 to be inserted, or there is no need to form a notched portion on the emission bulb inserting portion 44, thereby preventing reduction of thermal insulation effect due to the configuration of the holder 43.

Furthermore, with the present embodiment, as shown in FIG. 16, the bent portion 32b of the fine tube 30a should be formed so that the line passing through the center C2 of the end portion of the emission bulb 20 and the center C1 of the cap 42, and the line passing through the center C2 of the end portion of the emission bulb 20 and the center C3 of the tip end portion 32a of the fine tube 30a, intersect at an angle in the range between −45° and +45° so that the holder 43 does not prevent the end portion of the emission bulb 20 from being inserted into the emission bulb inserting portion 44. With the present embodiment having such a configuration, the fine tube 30a can be disposed in a desired position so that the fine tube 30a avoids the electronic parts 53, or the position of the principal amalgam 31, i.e., the position of the tip end portion 32a of the fine tube 30a is positioned at a desired position, while facilitating assembling.

Furthermore, with the present embodiment, the electrolytic capacitor 53a is erected offset from the general center of the circuit board 51 so as to be distanced from the inserting opening 52b, and accordingly, a wide space between the electrolytic capacitor 53a and the fine tube 30a is obtained, and accordingly, the fine tube 30a can be prevented from being pressed into contact with the electrolytic capacitor 53a when assembling, thereby facilitating assembling of the lamp.

Furthermore, with the present embodiment, the electrolytic capacitor 53a and the tip end portion 32c of the fine tube 30a, disposed generally at the center of the circuit board 41, are positioned inside the cylinder portion of the cover main unit 51 on the upper end side, and accordingly, the electrolytic capacitor 53a and the tip end portion 32c of the fine tube 30a can be contained without being in contact with the inner wall thereof.

Furthermore, with the present embodiment, the bent portion 32b is inserted into the inserting opening 52a of the circuit board 51 so that the aforementioned lines m and n are parallel one to another when the end portion of the emission bulb 20 is inserted into the emission bulb inserting portion 44. Thus, even in the event that the fine tube 30a is pressed into contact with the electrolytic capacitor 53a, the electrolytic capacitor 53a is not readily bent, thereby facilitating assembling in the same way as with the second embodiment.

Figure 18:
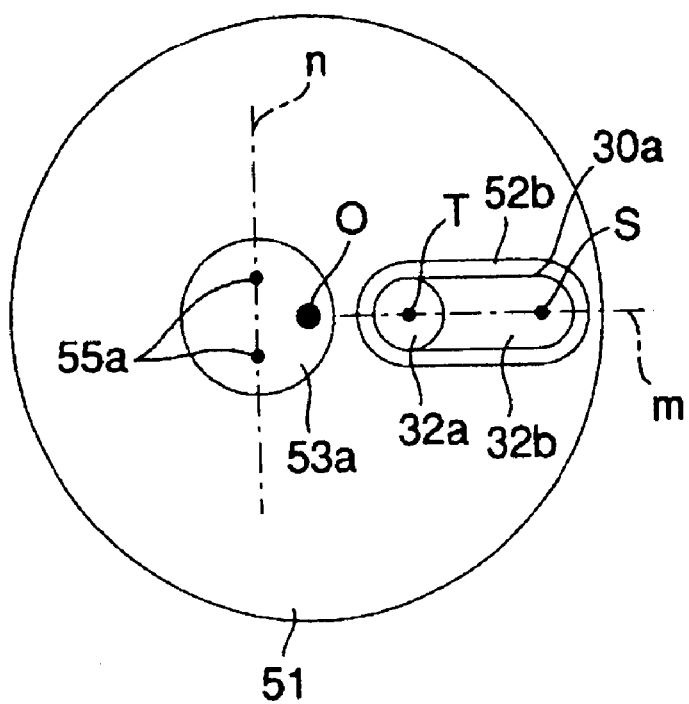
FIG. 18 is a plan view for describing the positional relation between the electrolytic capacitor mounted on the circuit board and the bent portion of the fine tube, which the bulb-shaped fluorescent lamp according to a fifth embodiment of the present invention includes.

Next, description will be made regarding a fifth embodiment of the present invention with reference to FIG. 18.

With the present embodiment, the position of the inserting opening 52b of the circuit board 51 is determined so that the line m passing through the base end portion 32d and the tip end portion 32c of the bent portion 32b is orthogonal to the line n passing through the board connectors 55a of the leads 55 making up a pair for electrically connecting the electrolytic capacitor 53a and other electronic parts 53. Other components are the same as with the fourth embodiment described above, so the same components are denoted with the same reference characters in FIG. 18, and description thereof will be omitted.

With the present embodiment, the same advantages as with the fourth embodiment can be obtained. Furthermore, with the present embodiment, the bent portion 32b is inserted into the inserting opening 52b of the circuit board 51 so that the aforementioned line m is orthogonal to the aforementioned line n when the end portion of the emission bulb 20 is inserted into the emission bulb inserting portion 44. Accordingly, even in the event that the fine tube 30a is pressed into contact with the electrolytic capacitor 53a, strain is not readily placed on the board connectors 55a of the leads 55, in the same way as with the third embodiment, thereby suppressing problems of loose electrical connections between the electrolytic capacitor 53a and other electronic parts 53.

Note that the positional relation between the bent portion 32b of the fine tube 30a and the electrolytic capacitor 53a, i.e., whether the aforementioned lines m and n should be parallel one to another, or should be orthogonal one to another, should be determined based upon the decision whether or not the advantages of facilitating assembling should be selected, or the advantages of suppressing problems of loose electrical connections between the electrolytic capacitor 53a and other electronic parts 53 should be selected.

With the second and fourth embodiments, while description has been made regarding an arrangement wherein the positional relation is determined so that the line m passing through the base end portion 32d and the tip end portion 32c of the bent portion 32b, and the line n passing through the board connectors 55a of the leads 55 making up a pair, form a single line, an arrangement may be made wherein the aforementioned lines m and n are parallel one to another. Note that the lines m and n may or may not form a single line.

With the second through fifth embodiments, an arrangement may be made wherein the aforementioned lines m and n exhibit a predetermined positional relation (parallel or orthogonal one to another). Note that the line m or the line n may or may not pass through the center O of the circuit board 51.

In the event that the electrolytic capacitor 53a is erected on the circuit board 51 offset from the center O away from the inserting opening 52b as shown in the fourth and fifth embodiments, the electrolytic capacitor 53a may or may not be positioned on the aforementioned line m.

With the second through fifth embodiments, an arrangement may be made wherein the bent portion 32b of the fine tube 30a is disposed at a position close to the emission bulb 20a as to the circuit board 51, and the fine tube inserting opening 52 of the circuit board 51 is formed in the shape of a circle where the tip end portion 32c of the fine tube 30a can be inserted in the same way as with the first embodiment.

With the arrangement having such a configuration, reduction of thermal insulation effect due to the configuration of the circuit board 51 can be suppressed. In this case, there is no need to pay regard to the positional relation between the bent portion 32b of the fine tube 30a and the electrolytic capacitor 53a.

Next, description will be made regarding a sixth embodiment of the present invention.

Figure 19:
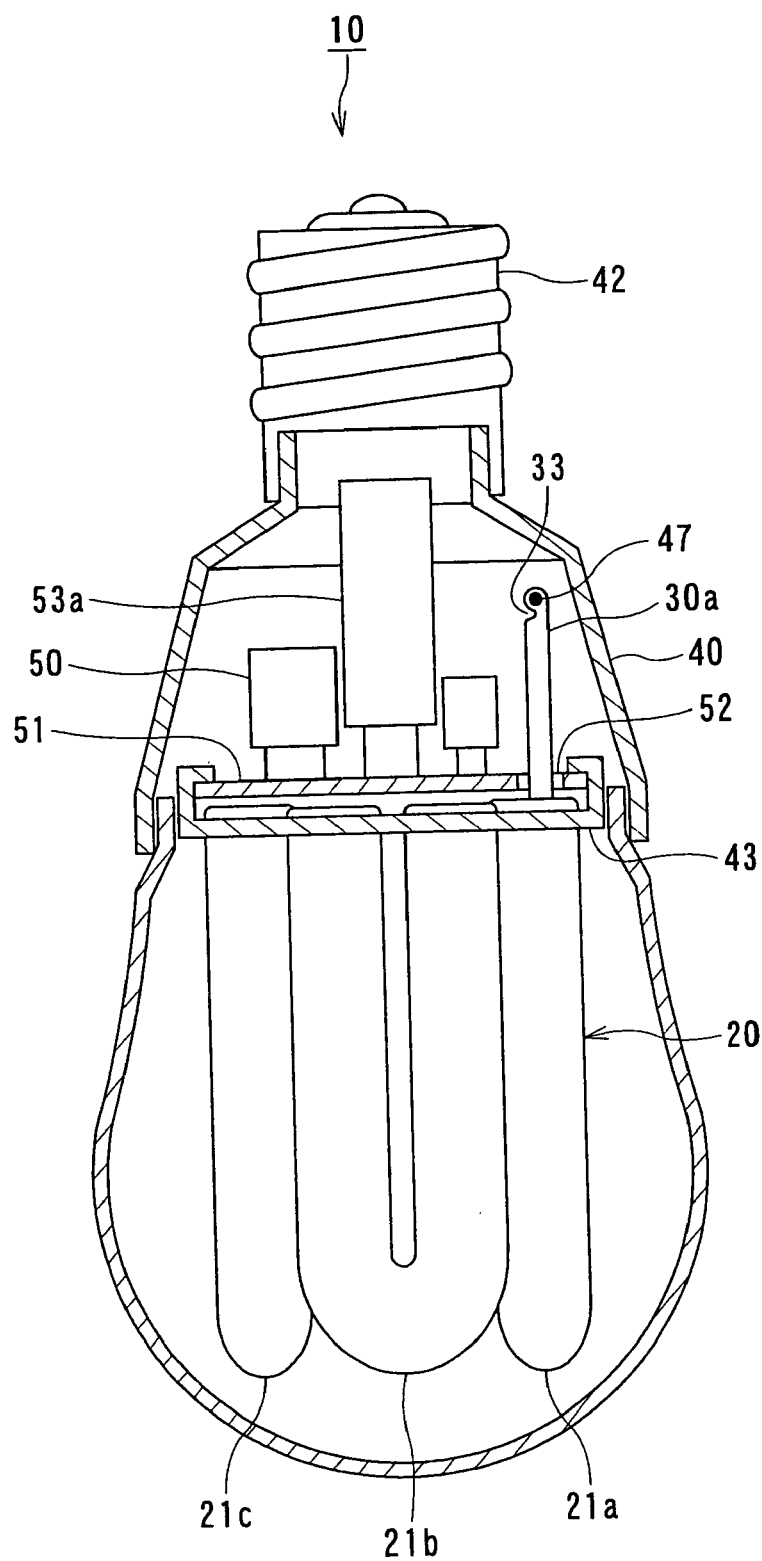
FIG. 19 is a partial cutaway side view which illustrates a bulb-shaped fluorescent lamp according to a sixth embodiment of the present invention.

FIG. 19 is a partial cutaway cross-sectional diagram which illustrates a bulb-shaped fluorescent lamp according to the sixth embodiment. Note that the same components as with the first embodiment are denoted with the same reference characters, and detailed description thereof will be omitted.

With the bulb-shaped fluorescent lamp 10 according to the present embodiment, a quantitative-sealing mercury pellet 47, formed of a zinc (Zn) amalgam, serving as a mercury-sealing member, is employed instead of a principal amalgam for controlling the mercury vapor pressure, so that mercury of 10 mg or less is sealed within the emission bulb 20. The pellet 47 is mounted on a recessed portion 33 formed on the fine tube 30a, following which the pellet is fixed to the end of the fine tube 30a with a method such as welding. Furthermore the fine tube 30a is also used as an exhaust tube. While description has been made regarding an arrangement according to the first embodiment wherein the fine tubes 30b and 30c are formed, with the present embodiment, the fine tubes 30a and 30c are used only when manufacturing of the emission bulb 20, and following manufacturing, the fine tubes 30a and 30c are chipped off at the ends thereof. Accordingly, with the present embodiment, only the fine tube 30a protrudes from the end of the emission bulb 20, so the distance between the holder 43 and the emission bulb 20 can be reduced, and thus the bulb-shaped fluorescent lamp 10 can be designed with a smaller height.

With the emission bulb 20 according to the present embodiment, the mercury vapor pressure is not controlled by the principal amalgam, and accordingly, the emission bulb 20 exhibits generally the same mercury vapor pressure properties as with a normal fluorescent lamp wherein pure mercury has been sealed. Furthermore, the tip portion of the fine tube 30a is disposed within the cover member 14 on the side of the cap 12, and the temperature of the tip portion is kept in the range around between 50 and 60° C. during stable lighting. Accordingly, the tip portion serves as a cooling portion within the fine tube during stable lighting. Thus, decrease of light quantity can be prevented during stable lighting, and also the light quantity rising properties can be improved.

Figure 20:
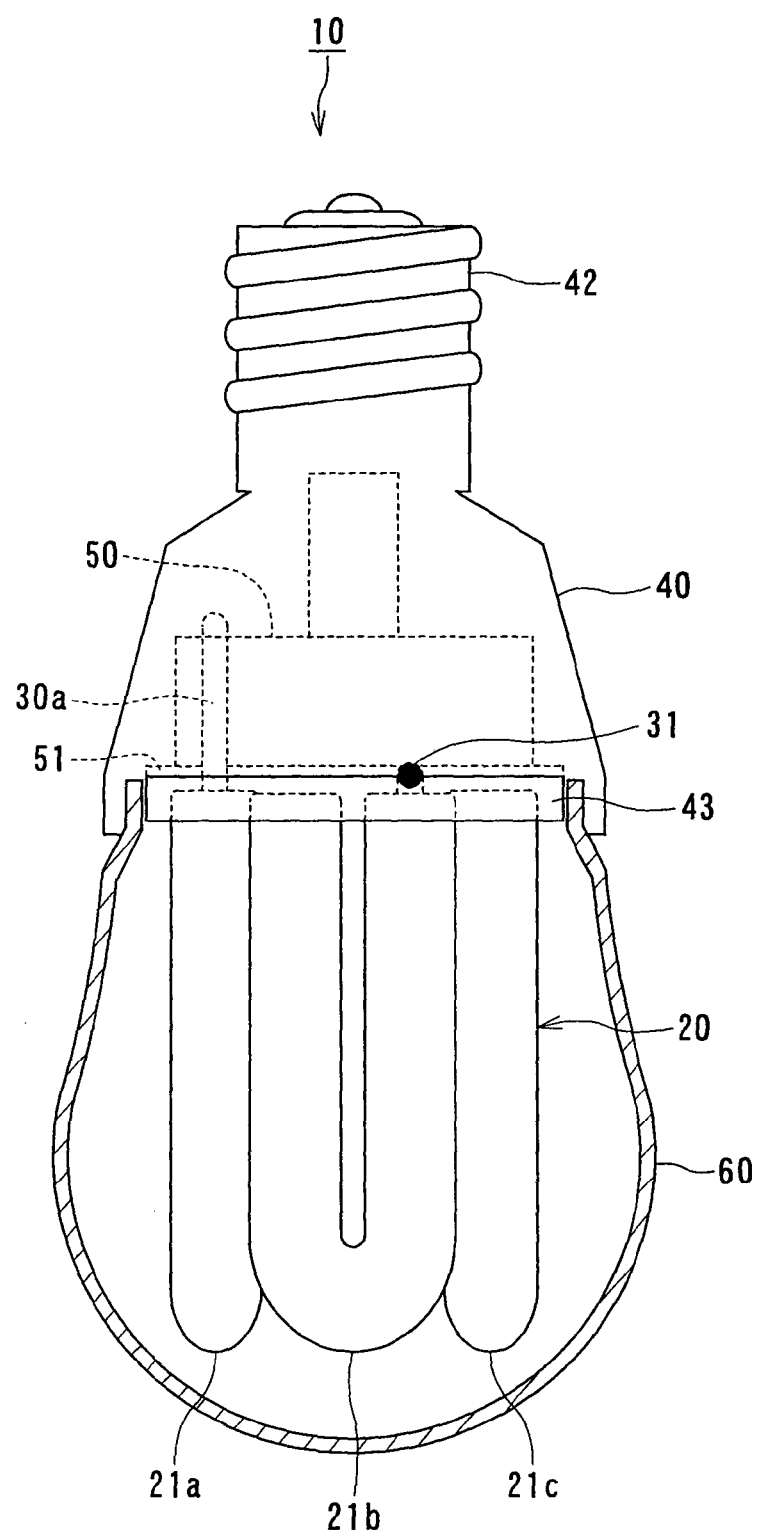
FIG. 20 is a partial cutaway side view which illustrates a bulb-shaped fluorescent lamp according to a seventh embodiment of the present invention.
Figure 21:
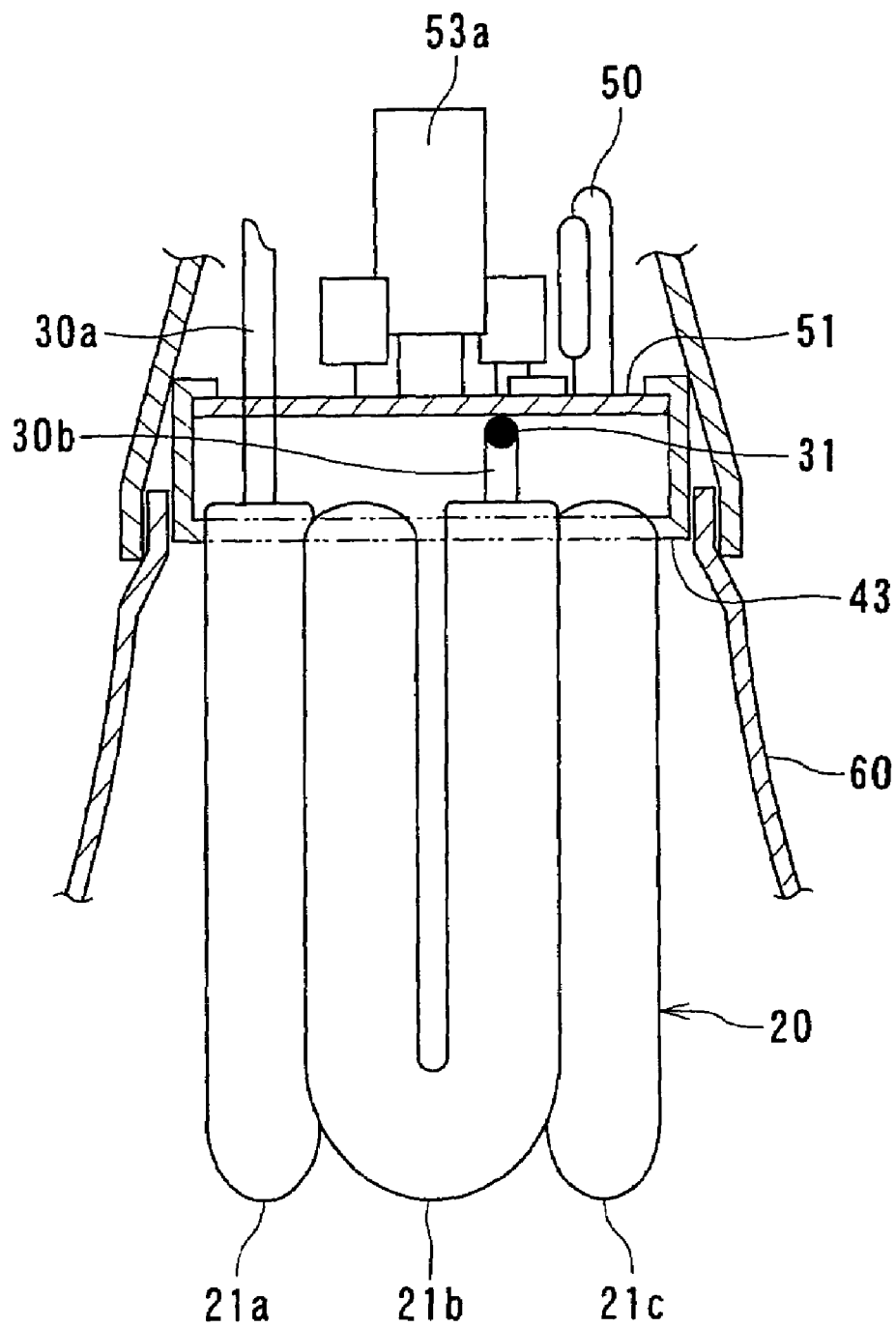
FIG. 21 is a partial cutaway enlarged cross-sectional diagram which illustrates the bulb-shaped fluorescent lamp shown in FIG. 20.

Next, description will be made regarding a seventh embodiment. FIG. 20 is a partial cutaway cross-sectional diagram which illustrates a bulb-shaped fluorescent lamp according to the seventh embodiment, and FIG. 21 is an enlarged partial cutaway cross-sectional diagram which illustrates the bulb-shaped fluorescent lamp shown in FIG. 20. Note that the same components as with the first and second embodiments are denoted with the same reference characters, and detailed description thereof will be omitted.

The fine tube 30b, which is the closest either electrodes making a pair, protrudes from the end of the emission bulb 20 by approximately 6 mm, and the principal amalgam 31 is sealed within the fine tube 30b. The principal amalgam 31 has the same mercury vapor pressure properties as with pure mercury, comprises an alloy formed of Bi—Sn—Hg, and is contained within the fine tube 30b so that the principal amalgam 31 does not move from the fine tube 30b into the emission bulb 20.

The other fine tube 30a of the bent tube 21a wherein a pair of electrodes have been sealed is the fine tube 30a serving as an exhaust tube. The fine tube 30a protrudes from the end of the bent tube 21a by around 30 mm, and the tip end portion is sucked to the inside of the fine tube 30a due to negative pressure within the bulb at the time of sealing. Accordingly, in particular, a sealing portion which is thin at the middle portion thereof, is formed.

The principal amalgam 31 comprises a composition of Bi—Sn—Hg, and accordingly, the mercury vapor pressure can be kept relatively high within the emission bulb 20 at room temperature. During stable lighting of the lamp, the temperature of the emission bulb 20 encased in the globe 60 increases, and high temperature is observed. However, in the present embodiment, the exhaust tube 30a is extended within the cover member 40 on the side of the cap 42 so as to avoid thermal influence from the emission bulb 20, the temperature around the tip end of the exhaust tube 30a is suppressed to 60° C. or less. That is to say, the circuit board 51 insulates the tip end portion of the exhaust tube 30a from the heat emitted from the emission bulb 20, convection current does not occur readily, and thus, the temperature of the internal space on the side of the cap 42 does not become high as compared with the internal space on the side of the emission bulb 20.

Thus, even in the event that the temperature of the emission bulb 20 becomes high at the time of lighting, excessive mercury is absorbed into the cooling portion around the tip end of the exhaust tube 30a extending within the cover member 40 so that an excess of the mercury vapor pressure is not caused within the emission bulb 20, and accordingly, the mercury vapor pressure is kept around the optimal value, thereby preventing reduction of the luminance efficiency. Furthermore, the mercury vapor pressure is high when the lamp is turned off as compared with an arrangement wherein an amalgam which causes low mercury vapor pressure is employed for the principal amalgam 31, and accordingly, the light quantity rising properties immediately following turning on is improved, and also reduction of luminance efficiency when the lamp is turned on is suppressed.

According to the bulb-shaped fluorescent lamp 10 having such a configuration, the emission bulb 20 is encased within the globe 60, the exhaust tube 30a is away from the electrodes, is inserted into the circuit board 51a on the side of the cap 42, and is extended within the cover member 40. Accordingly, the temperature of a portion of the exhaust tube 30a is suppressed to the range between 50 and 60° C. even in the event that the temperature of the emission bulb 20 encased within the globe 60 increases. Thus, the portion where the temperature is suppressed in the range between 50 and 60° C. serves as a cooling portion formed on the exhaust tube 30a, and even in the event that the temperature of the emission bulb 20 increases, the excessive mercury vapor in the emission bulb 20 is absorbed, and thus the mercury vapor pressure can be kept to a desired pressure within the emission bulb 20.

In the event that a sealing portion of the exhaust tube 30a is formed around the portion where the fine tube has been welded to the end of the bent tube 21a, cracks may occur due to heating at the time of sealing, leading to slow leak. With the embodiment, the exhaust tube 30a is formed with a long length, thereby suppressing occurrence of cracks at the sealing portion.

Note that while description has been made regarding an example wherein the bulb-shaped fluorescent lamp according to the present embodiment is positioned with the side of the cap 42 on the upper side, and with the side of the emission bulb 20 on the lower side, the same operations can be obtained regardless of how the bulb-shaped fluorescent lamp is positioned when the lamp is turned on. For example, in a case of base-down lighting, i.e., an example wherein the bulb-shaped fluorescent lamp is positioned with the side of the cap 42 on the lower side, and with the side of the emission bulb 20 on the upper side, the same operations can be obtained, as well.

Next, description will be made regarding to a bulb-shaped fluorescent lamp according to an eighth embodiment of the present invention, with reference to the drawings.

Figure 22:
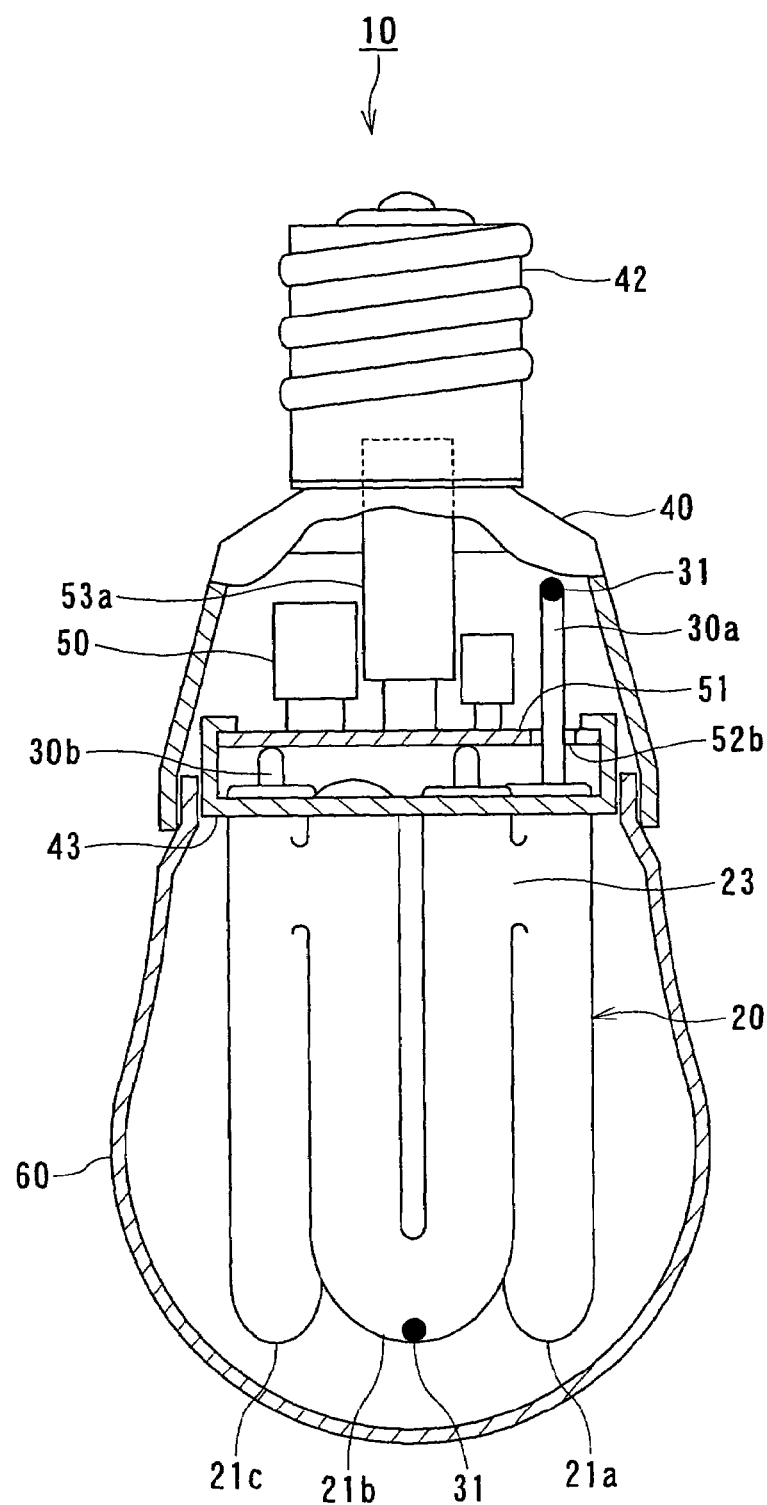
FIG. 22 is a partial cutaway side view which illustrates a bulb-shaped fluorescent lamp according to an eighth embodiment of the present invention.

FIG. 22 is a partial cross-sectional diagram which illustrates the bulb-shaped fluorescent lamp 10 according to the eighth embodiment of the present invention. Note that the same components as with the first through seventh embodiments are denoted with the same reference characters, and detailed description will be omitted.

As shown in FIG. 22, the principal amalgams 31 comprising Bi—Sn—In, for example, for controlling the mercury vapor pressure within the emission bulb 20 to be desired pressure, which has been formed in the shape of a grain, or in the shape of an agglomerate so as to move within the emission bulb 20, are sealed within the bent tube 21b, and within the fine tube 30a extending within the cover member.

Furthermore, the fine tube 30a welded to the bent tube 21a protrudes from the end portion of the emission bulb 20 so that the tip end is positioned within the cover member 40 on the side of the cap 42, wherein the length of the protrusion is preferably between 25 to 70 mm. With the present embodiment, the protrusion length from the portion where the fine tube 30a is welded, up to the tip end of the fine tube 30a, is approximately 40 mm as height.

The principal amalgam 31 comprises a base formed of an alloy of bismuth (Bi) in the range between 50 and 65% by mass, and tin (Sn) in the range between 35 and 50% by mass, containing mercury in the range between 12 and 25% by mass.

The inserting opening 52b serving as an inserting opening for a fine tube with a diameter of approximately 6 mm is formed on the circuit board 51 in the shape of a circle or an ellipse. The tip of the fine tube 30a is extended to a space within the cover member 40 on the side of the cap 42 through the inserting opening 52b.

With the bulb-shaped fluorescent lamp 10 having such a configuration, the principal amalgam 31 sealed within the fine tube 30a is heated due to heat emitted from the emission bulb when the lamp is turned on, and the amalgam 31 emits mercury. The emitted mercury is diffused within the emission bulb 20. Furthermore, the principal amalgam 31 sealed within the emission bulb 20 emits mercury immediately following turning on. Upon the mercury vapor pressure increasing corresponding to elapsing of time while lighting, the emission bulb 20 is filled with the mercury vapor, and the principal amalgam 31 movably sealed within the emission bulb 20 absorbs the excessive mercury. Accordingly, the mercury vapor pressure within the emission bulb 20 is kept constant, thereby obtaining predetermined lamp properties.

Figure 23:
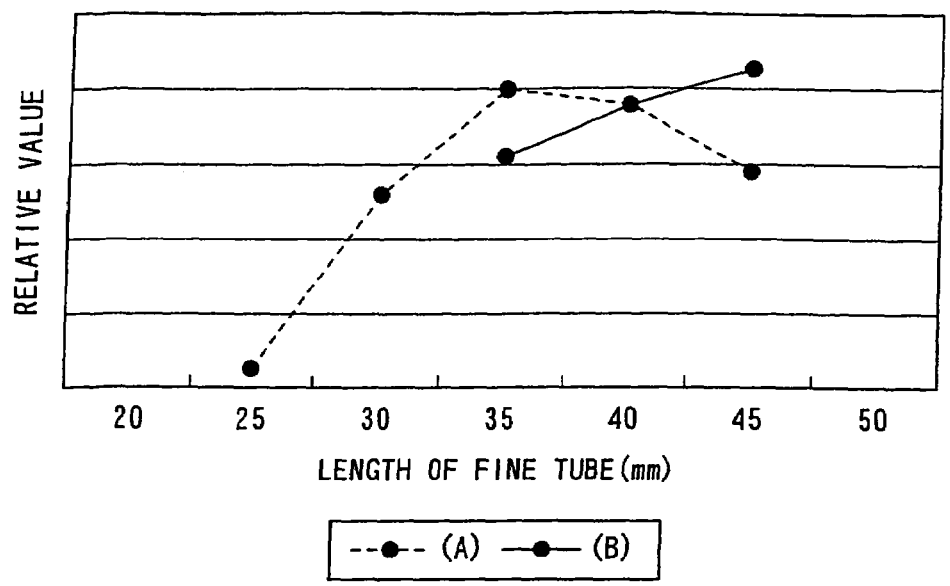
FIG. 23 shows a relative chart which indicates the experimental results indicating the optimal length of the fine tube and the optimal position for sealing the amalgam for obtaining the maximal light quantity.

FIG. 23 shows a chart which indicates the relation between the entire light quantity and the length of the fine tube 30a. In FIG. 23, a dashed line (A) indicates the relation in a case of the bulb-shaped fluorescent lamp according to the first embodiment of the present invention with the length of the fine tube 30a, where the principal amalgam 31 which causes high mercury vapor pressure generally the same as with pure mercury has been sealed, being changed in the range between 25 and 45 mm, wherein lighting is performed with the constant input electric power of 12 W. On the other hand, a line (B) indicates the relation in a case of the bulb-shaped fluorescent lamp according to the seventh embodiment of the present invention with the length of the fine tube 30a, where the principal amalgam 31 has not been sealed, being changed in the range between 25 and 45 mm, wherein the principal amalgam 31 which causes high mercury vapor pressure generally the same as with pure mercury has been sealed within the fine tube 30b other than the fine tube 30a, and lighting is performed with the constant input electric power of 12 W.

As can be clearly understood from the chart shown in FIG. 23, the relation (A) in a case of the bulb-shaped fluorescent lamp with the length of the fine tube 30a, where the principal amalgam 31 which causes high mercury vapor pressure generally the same as with pure mercury has been sealed, being changed in the range between 25 and 45 mm, exhibits the maximal light quantity of 720 lm with the tube length of 35 mm, and the entire light quantity decreases with a tube length exceeding 35 mm. This is because the farther from the emission bulb 20 which exhibits high temperature when on, the lower the temperature is within the cover member 40, and accordingly, a space where the tip end of the fine tube 30a is positioned exhibits a temperature lower than the temperature which causes the optimal mercury vapor pressure from the principal amalgam. Conversely, in the event that the length of the fine tube 30a is equal to or less than 35 mm, the tip end portion of the fine tube 30a where the principal amalgam 31 has been disposed is positioned at a space close to the emission bulb 20, and accordingly, a space where the tip end of the fine tube 30a is positioned exhibits a temperature higher than the temperature which brings about the optimal mercury vapor pressure from the amalgam, leading to reduction of the luminance efficiency.

On the other hand, the relation (B) in a case of the bulb-shaped fluorescent lamp with the length of the fine tube 30a being changed in the range between 25 and 45 mm, wherein the amalgam 31 has been sealed within the fine tube 30b other than the fine tube 30a, exhibits the maximal light quantity of 720 lm with the tube length of 45 mm. In this case, a portion of the fine tube 30b serves as a cooling portion which controls the mercury vapor pressure. Making a comparison between the bulb-shaped fluorescent lamps (A) and (B), with the bulb-shaped fluorescent lamp (A), the temperature which causes the optimal mercury vapor pressure, is higher than the temperature in a case of the bulb-shaped fluorescent lamp (B) by approximately 10° C., and accordingly, with the bulb-shaped fluorescent lamp (A), the fine tube 30b can be formed with a length less than the length in a case of the bulb-shaped fluorescent lamp (B) by approximately 10 mm.

Figure 24:
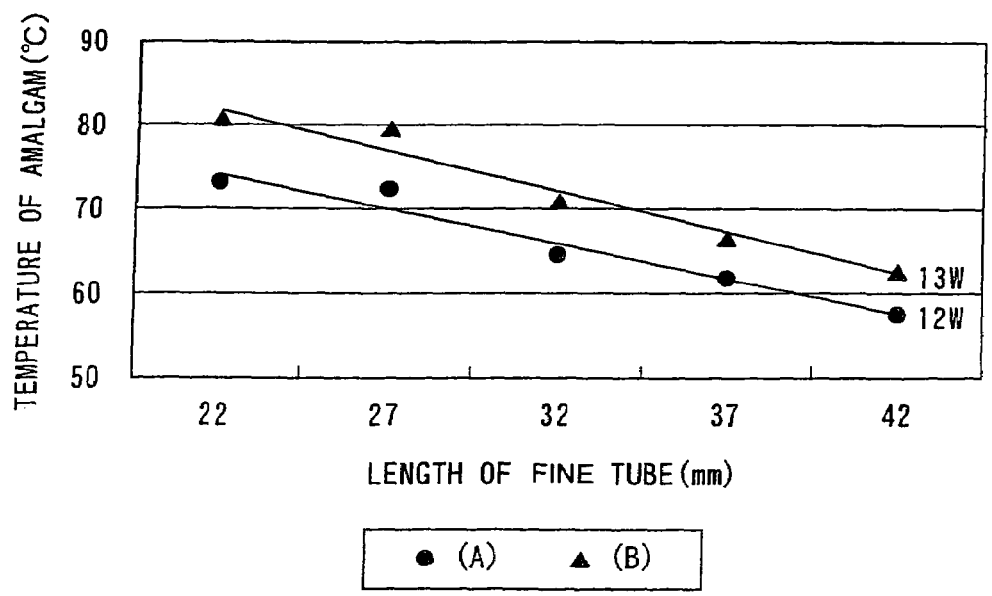
FIG. 24 shows a chart which indicates the relation between the protrusion length of the fine tube and the temperature of the amalgam.

FIG. 24 shows a chart which indicates the change in the temperature of the amalgam in a case of the bulb-shaped fluorescent lamp according to the sixth embodiment of the present invention with the length of the fine tube 30a where the principal amalgam has been sealed being changed in the range between 22 and 42 mm, wherein lighting is performed with the input electric power of 12 W (A) or 13 W (B).

As can be clearly understood from the chart shown in FIG. 24, with both of the bulb-shaped fluorescent lamps (a) and (b), the longer the length of the fine tube 30a is, the lower the temperature of the amalgam sealed within the fine tube is. That is because the farther from the emission bulb which exhibits high temperature when the lamp is turned on, the less thermal influence of the emission bulb the amalgam is under. In addition, in the event that the fine tube is formed with a great length, the fine tube is disposed at a position within the cover member on the cap side where the temperature is relatively low, and accordingly, synergistic effects can be expected.

The inventor has found the relation between the input electric power for the lamp and the tube length from the test results, wherein the fine tube 30a where the principal amalgam 31 has been sealed protrudes from the end of the emission bulb 20 toward a space within the cover member 40 on the side of the cap 42. With the input electric power for the lamp as X (W), and with the tube length as Y (mm), the aforementioned relation is represented by the following expression.

$$5X-37 \geq Y \geq 5X-17$$

Furthermore, as described in the bulb-shaped fluorescent lamp according to the seventh embodiment of the present invention, it has been found that in a case of an arrangement wherein the amalgam 31 has been sealed within the short fine tube 30b protruding from the end of the emission bulb 20, the length of the fine tube 30a protruding within the cover member 40 on the side of the cap 42 can be calculated with the following expression.

$$5X-27 \geq Y \geq 5X-7$$

As described above, with the bulb-shaped fluorescent lamp according to the present invention, the light quantity rising properties can be improved with a simple configuration, and furthermore, assembly thereof is facilitated.

Furthermore, with the illumination device according to the present invention, the light quantity rising properties can be improved with a simple configuration, and furthermore, assembly thereof is facilitated due to the provided bulb-shaped fluorescent lamp.

In particular, with the bulb-shaped fluorescent lamp according to the present invention, the fine tube protruding from the emission bulb is extended toward the cap side, and accordingly, pure mercury or a principal amalgam which causes high mercury vapor pressure generally the same as with pure mercury can be sealed. As a result, the light quantity rising property immediately following turning on is improved, and also reduction of the luminance efficiency when the lamp is turned on can be suppressed, as compared with a case of employing conventional amalgam which causes low mercury vapor pressure.

Furthermore, in the event that the principal amalgam is positioned at a space within the cover member on the cap side where the temperature is relatively low, an amalgam which causes high mercury vapor pressure can be employed for the principal amalgam, thereby improving the light quantity rising properties with a simple configuration.

Furthermore, in the event that the fine tube protruding from the emission bulb is extended on the cap side, and the principal amalgam sealed therewithin is distanced from the circuit board face in the direction of the cap side by a predetermined distance, an amalgam which causes high mercury vapor pressure can be employed for the principal amalgam, thereby improving the light quantity rising properties with a simple configuration.

Furthermore, with the bulb-shaped fluorescent lamp according to the present invention, the fine tube protruding from the emission bulb is formed with the length between 25 to 60 mm, and accordingly, the temperature of the principal amalgam sealed within the fine tube protruding within the cover member in the cap side direction can be kept at the temperature which causes the optimal mercury vapor pressure at the time of stable lighting. Thus, an amalgam which causes high mercury vapor pressure can be employed for the amalgam, thereby improving the luminance efficiency.

Furthermore, in the event that the fine tube protruding from the emission bulb is extended up to a space within the cover member on the cap side, a portion of the fine tube serves as a cooling portion during stable lighting, and accordingly, the same mercury vapor pressure properties as with pure mercury can be obtained, thereby improving the light quantity rising properties with a simple configuration without reduction of light output during stable lighting.

Furthermore, in the event that the fine tube protrudes by a predetermined length, pure mercury or an amalgam which causes a mercury vapor pressure close to that of pure mercury can be employed, and accordingly, the mercury vapor pressure when the lamp is turned off is high as compared with a case of employing a conventional amalgam which causes low mercury vapor pressure. Thus, the light quantity rising properties immediately following turning on is improved, and reduction of luminance efficiency when the lamp is turned on can be suppressed.

Furthermore, in the event that the emission bulb is mounted on the cover member so that the longitudinal direction of the emission bulb and the circuit board face are generally orthogonal one to another, the fine tube is extended on the cap side through the inserting portion formed on the circuit board, and accordingly, increase of the temperature of the space within the cover member on the cap side is prevented, and thus the temperature of the fine tube can be kept at a predetermined temperature.

Furthermore, the composition making up the principal amalgam can be optimized, so that the light quantity rising properties are further improved. Furthermore, the composition making up the auxiliary amalgam can be optimized, so that reduction of light quantity due to shortage of mercury immediately following turning on is prevented even in the event that the principal amalgam is disposed on the cap side, thereby improving the light quantity rising properties in a sure manner.

Furthermore, the principal amalgam is disposed on the cap side, and accordingly, an amalgam which causes high mercury vapor pressure can be employed for the principal amalgam even in a case of a bulb-shaped fluorescent lamp with globe, thereby markedly improving light quantity rising properties. Furthermore, the present invention can provide an illumination device with excellent properties.

What is claimed is:

1. A bulb-shaped fluorescent lamp comprising:
    an emission bulb having a bent tube;
    a lighting device having a circuit board and electronic parts mounted on said circuit board for outputting high-frequency electric power to said emission bulb;
    a cover member, wherein a cap is provided on a cap end side, a holder is provided on a holder end side for holding said emission bulb, and said lighting device is contained with said circuit board being mounted so that a great part of said electronic parts are disposed on the cap side; and
    a fine tube having a configuration wherein said fine tube is extended from the end of a portion of said bent tube toward the cap side within said cover member, and protrudes so that the surface temperature of a portion of said fine tube is kept in the range between 40 and 70° C. at the time of normal lighting.

2. A bulb-shaped fluorescent lamp comprising:
    an emission bulb having a bent tube;

a lighting device having a circuit board and electronic parts mounted on said circuit board for outputting high-frequency electric power to said emission bulb;

a cover member, wherein a cap is provided on a cap end side, a holder is provided on a holder end side for holding said emission bulb, and said lighting device is contained with said circuit board being mounted so that a great part of said electronic parts are disposed on the cap side; and a fine tube extending from an end of said bent tube toward the cap side within said cover member, which protrudes from the end of said bent tube by 25 to 70 mm.

3. A bulb-shaped fluorescent lamp according to claim 1, wherein a principal amalgam is contained within said fine tube, and said principal amalgam is contained at a position closer to the cap side than said electronic parts.

4. A bulb-shaped fluorescent lamp according to claim 1, wherein said circuit board has an electrolytic capacitor for smoothing as an electronic part, said lighting device converts DC output from said electrolytic capacitor into high-frequency electric power so as to be output to said emission bulb, said electrolytic capacitor is disposed on the cap side of said circuit board, a principal amalgam is contained within said fine tube, and said principal amalgam is contained so as to be positioned closer to the cap side than said electronic parts excluding said electrolytic capacitor.

5. A bulb-shaped fluorescent lamp according to claim 3, wherein said circuit board is mounted on said cover member so as to be generally orthogonal to the longitudinal direction of said emission bulb, and said principal amalgam is contained within said fine tube so as to be positioned away from the face of said circuit board by 5 to 50 mm.

6. A bulb-shaped fluorescent lamp according to claim 1, wherein said cover member includes a globe having an opening on one end thereof, the opening side of said globe is mounted on said cover member so that said globe covers said emission bulb, an amalgam is contained within said fine tube, and said fine tube protrudes from an end of said emission bulb by 25 to 60 mm in a case of lamp input electric power in the range between 7 and 25 W.

7. A bulb-shaped fluorescent lamp according to claim 1, wherein said fine tube is extended from a portion of said bent tube closer toward the cap side than said electronic parts and a discharge medium which contains mercury and causes generally the same vapor pressure as with pure mercury is sealed within the fine tube.

8. A bulb-shaped fluorescent lamp according to claim 1, wherein said cover member includes a globe having an opening on one end thereof, the opening side of said globe is mounted on said cover member so that said globe covers said emission bulb, and said fine tube protrudes so that the surface temperature of a portion of said fine tube is kept in a range between 40 and 60° C. when the lamp normally turns on.

9. A bulb-shaped fluorescent lamp according to claim 1, wherein said cover member includes a globe having an opening on one end thereof, the opening side of said globe is mounted on said cover member so that said globe covers said emission bulb, and said fine tube protrudes from an end of said emission bulb by 25 to 70 mm in a case of the lamp input electric power in a range between 7 and 25 W.

10. A bulb-shaped fluorescent lamp according to claim 1, wherein said circuit board has an inserting portion through which said fine tube can pass, and said circuit board is mounted on said cover member so as to be generally orthogonal to the longitudinal direction of the bent tube making up said emission bulb.

11. A bulb-shaped fluorescent lamp according to claim 1, wherein a principal amalgam is sealed within said emission bulb, the content of mercury (Hg) as to the entire alloy of the principal amalgam is 3% by mass or more, and metal forming said alloy comprises at least a metal selected from a group of bismuth (Bi), lead (Pb), zinc (Zn), and tin (Sn).

12. A bulb-shaped fluorescent lamp according to claim 1, wherein an auxiliary amalgam is sealed within said emission bulb, and a metal base forming said auxiliary amalgam comprises at least a metal selected from a group of gold (Au), silver (Ag), palladium (Pd), platinum (Pt), lead (Pb), zinc (Zn), bismuth (Bi), and tin (Sn), as a principal component.

13. A bulb-shaped fluorescent lamp according to claim 1, wherein said emission bulb is covered with a globe mounted on said cover member, and the maximal diameter of said globe is equal to or less than 65 mm.

14. A bulb-shaped fluorescent lamp according to claim 1, wherein said circuit board has a fine tube inserting portion for inserting said fine tube, said fine tube is formed with a diameter less than the outer diameter of the bent tube of said emission bulb, said fine tube protrudes from an end of said emission bulb and has a bent portion on the middle portion thereof, a tip end portion of said fine tube from said bent portion is disposed close to the axis passing through the center of said cap as compared with the base portion of said fine tube from said bent portion on the side of said emission bulb, and an amalgam is contained within said fine tube.

15. A bulb-shaped fluorescent lamp according to claim 14, wherein the bent portion of said fine tube is disposed at a position closer to the emission bulb side than said circuit board, and the tip end portion of said fine tube is inserted into said fine tube inserting portion so as to extend on the side of said cap.

16. A bulb-shaped fluorescent lamp according to claim 14, wherein said cap is provided to one end of said cover member, and said holder for holding said emission bulb, which has an emission bulb inserting portion through which the end of said emission bulb can pass, and has a notched portion formed on said emission bulb inserting portion, is provided to the other end of said cover member, said circuit board is mounted and said cover member contains said lighting device so that a great part of said electric parts are disposed on the side of said cap, the tip end portion of said fine tube extends closer to the side of the cap than said electronic parts and said bent portion passes through said notched portion when inserting the end portion of said emission bulb into said emission bulb inserting portion.

17. A bulb-shaped fluorescent lamp according to claim 14, wherein said cap is provided to one end of said cover member, and said holder for holding said emission bulb, which has an emission bulb inserting portion through which the end of said emission bulb can pass, is provided to the other end of said cover member, said circuit board is mounted and said cover member contains said lighting device so that a great part of said electric parts are disposed on the side of said cap, the tip end portion of said fine tube extends closer to the side of the cap than said electronic parts and said bent portion is bent so that said holder does not interfere with inserting of said bent portion when inserting the end portion of said emission bulb into said emission bulb inserting portion.

18. A bulb-shaped fluorescent lamp according to claim 17, wherein said bent portion is formed so that a line passing through the center of the end portion of said emission bulb and the center of said cap, and a line passing through the center of end portion of said emission bulb and the center of the tip end portion of said fine tube, intersect at an angle in the range between −45° and +45°.

19. A bulb-shaped fluorescent lamp according to claim 14, wherein an electrolytic capacitor is mounted on said circuit board as an electronic part having a pair of leads erected on said circuit board, wherein a line passing through connectors on said circuit board for said leads making a pair, and a line passing through the base end portion and the tip end portion of the bent portion of said fine tube, are orthogonal one to another.

20. A bulb-shaped fluorescent lamp according to claim 14, wherein an electrolytic capacitor is mounted on said circuit board as an electronic part having a pair of leads erected on said circuit board, wherein a line passing through connectors on said circuit board for said leads making a pair, and a line passing through the base end portion and the tip end portion of the bent portion of said fine tube, are parallel one to another.

21. An illumination device comprising:
the bulb-shaped fluorescent lamp according claim 1; and
a device main unit for detachably mounting said bulb-shaped fluorescent lamp.

22. A bulb-shaped fluorescent lamp according to claim 2, wherein a principal amalgam is contained within said fine tube, and said principal amalgam is contained at a position closer to the cap side than said electronic parts.

23. A bulb-shaped fluorescent lamp according to claim 2, wherein said circuit board has an electrolytic capacitor for smoothing as an electronic part, said lighting device converts DC output from said electrolytic capacitor into high-frequency electric power so as to be output to said emission bulb, said electrolytic capacitor is disposed on the cap side of said circuit board, a principal amalgam is contained within said fine tube, and said principal amalgam is contained so as to be positioned closer to the cap side than said electronic parts excluding said electrolytic capacitor.

24. A bulb-shaped fluorescent lamp according to claim 22, wherein said circuit board is mounted on said cover member so as to be generally orthogonal to the longitudinal direction of said emission bulb, and said principal amalgam is contained within said fine tube so as to be positioned away from the face of said circuit board by 5 to 50 mm.

25. A bulb-shaped fluorescent lamp according to claim 2, wherein said cover member includes a globe having an opening on one end thereof, the opening side of said globe is mounted on said cover member so that said globe covers said emission bulb, an amalgam is contained within said fine tube, and said fine tube protrudes from an end of said emission bulb by 25 to 60 mm in a case of lamp input electric power in the range between 7 and 25 W.

26. A bulb-shaped fluorescent lamp according to claim 2, wherein said fine tube is extended from a portion of said bent tube closer toward the cap side than said electronic parts and a discharge medium which contains mercury and causes generally the same vapor pressure as with pure mercury is sealed within the fine tube.

27. A bulb-shaped fluorescent lamp according to claim 2, wherein said cover member includes a globe having an opening on one end thereof, the opening side of said globe is mounted on said cover member so that said globe covers said emission bulb, and said fine tube protrudes so that the surface temperature of a portion of said fine tube is kept in a range between 40 and 60° C. when the lamp normally turns on.

28. A bulb-shaped fluorescent lamp according to claim 2, wherein said cover member includes a globe having an opening on one end thereof, the opening side of said globe is mounted on said cover member so that said globe covers said emission bulb, and said fine tube protrudes from an end of said emission bulb by 25 to 70 mm in a case of the lamp input electric power in a range between 7 and 25 W.

29. A bulb-shaped fluorescent lamp according to claim 2, wherein said circuit board has an inserting portion through which said fine tube can pass, and said circuit board is mounted on said cover member so as to be generally orthogonal to the longitudinal direction of the bent tube making up said emission bulb.

30. A bulb-shaped fluorescent lamp according to claim 2, wherein a principal amalgam is sealed within said emission bulb, the content of mercury (Hg) as to the entire alloy of the principal amalgam is 3% by mass or more, and metal forming said alloy comprises at least a metal selected from a group of bismuth (Bi), lead (Pb), zinc (Zn), and tin (Sn).

31. A bulb-shaped fluorescent lamp according to 2, wherein an auxiliary amalgam is sealed within said emission bulb, and a metal base forming said auxiliary amalgam comprises at least a metal selected from a group of gold (Au), silver (Ag), palladium (Pd), platinum (Pt), lead (Pb), zinc (Zn), bismuth (Bi), and tin (Sn), as a principal component.

32. A bulb-shaped fluorescent lamp according to claim 2, wherein said emission bulb is covered with a globe mounted on said cover member, and the maximal diameter of said globe is equal to or less than 65 mm.

33. A bulb-shaped fluorescent lamp according to claim 2, wherein said circuit board has a fine tube inserting portion for inserting said fine tube, said fine tube is formed with a diameter less than the outer diameter of the bent tube of said emission bulb, said fine tube protrudes from an end of said emission bulb and has a bent portion on the middle portion thereof, a tip end portion of said fine tube from said bent portion is disposed close to the axis passing through the center of said cap as compared with the base portion of said fine tube from said bent portion on the side of said emission bulb, and an amalgam is contained within said fine tube.

34. A bulb-shaped fluorescent lamp according to claim 33, wherein the bent portion of said fine tube is disposed at a position closer to the emission bulb side than said circuit board, and the tip end portion of said fine tube is inserted into said fine tube inserting portion so as to extend on the side of said cap.

35. A bulb-shaped fluorescent lamp according to claim 33, wherein said cap is provided to one end of said cover member, and said holder for holding said emission bulb, which has an emission bulb inserting portion through which the end of said emission bulb can pass, and has a notched portion formed on said emission bulb inserting portion, is provided to the other end of said cover member, said circuit board is mounted and said cover member contains said lighting device so that a great part of said electric parts are disposed on the side of said cap, the tip end portion of said fine tube extends closer to the side of the cap than said electronic parts and said bent portion passes through said notched portion when inserting the end portion of said emission bulb into said emission bulb inserting portion.

36. A bulb-shaped fluorescent lamp according to claim 33, wherein said cap is provided to one end of said cover member, and said holder for holding said emission bulb, which has an emission bulb inserting portion through which the end of said emission bulb can pass, is provided to the other end of said cover member, said circuit board is mounted and said cover member contains said lighting device so that a great part of said electric parts are disposed on the side of said cap, the tip end portion of said fine tube extends closer to the side of the cap than said electronic parts and said bent portion is bent so that said holder does not interfere with inserting of said bent portion when inserting the end portion of said emission bulb into said emission bulb inserting portion.

37. A bulb-shaped fluorescent lamp according to claim 36, wherein said bent portion is formed so that a line passing through the center of the end portion of said emission bulb and the center of said cap, and a line passing through the center of end portion of said emission bulb and the center of the tip end portion of said fine tube, intersect at an angle in the range between −45° and +45°.

38. A bulb-shaped fluorescent lamp according to claim 33, wherein an electrolytic capacitor is mounted on said circuit board as an electronic part having a pair of leads erected on said circuit board, wherein a line passing through connectors on said circuit board for said leads making a pair, and a line passing through the base end portion and the tip end portion of the bent portion of said fine tube, are orthogonal one to another.

39. A bulb-shaped fluorescent lamp according to claim 33, wherein an electrolytic capacitor is mounted on said circuit board as an electronic part having a pair of leads erected on said circuit board, wherein a line passing through connectors on said circuit board for said leads making a pair, and a line passing through the base end portion and the tip end portion of the bent portion of said fine tube, are parallel one to another.

* * * * *